(12) United States Patent
Yamanouchi et al.

(10) Patent No.: US 8,121,451 B2
(45) Date of Patent: Feb. 21, 2012

(54) MODULE HAVING A PLURALITY OF CIRCUIT BOARDS STACKED WITH A PRESCRIBED DISTANCE THEREBETWEEN AND OPTICAL CONNECTOR FOR THE SAME

(75) Inventors: Yuchi Yamanouchi, Toyota (JP); Ryoji Oomura, Saitama (JP)

(73) Assignee: Toyota Jidosha Kabushiki Kaisha, Tohota-shi, Aichi-ken (JP)

( * ) Notice: Subject to any disclaimer, the term of this patent is extended or adjusted under 35 U.S.C. 154(b) by 361 days.

(21) Appl. No.: 12/293,676

(22) PCT Filed: Mar. 21, 2007

(86) PCT No.: PCT/IB2007/000792
§ 371 (c)(1),
(2), (4) Date: Sep. 19, 2008

(87) PCT Pub. No.: WO2007/107877
PCT Pub. Date: Sep. 27, 2007

(65) Prior Publication Data
US 2010/0158442 A1    Jun. 24, 2010

(30) Foreign Application Priority Data
Mar. 22, 2006  (JP) ................ 2006-078869

(51) Int. Cl.
*G02B 6/30*    (2006.01)
(52) U.S. Cl. ........................... 385/49; 385/14
(58) Field of Classification Search .......... 385/14, 385/24, 33, 34, 39, 49, 53, 55, 56, 58, 60, 385/70, 72, 76, 78, 84, 86, 88, 90, 91, 92; 359/811, 819; 439/541.5, 581, 607.11, 617, 620.06, 620.11
See application file for complete search history.

(56) References Cited

U.S. PATENT DOCUMENTS

| | | | | |
|---|---|---|---|---|
| 4,149,764 A * | 4/1979 | Mattingly, Jr. | ................ | 439/75 |
| 5,672,062 A * | 9/1997 | Lindeman | ........................ | 439/66 |
| 5,682,449 A * | 10/1997 | Taira-Griffin | ................ | 385/47 |
| 5,920,664 A * | 7/1999 | Hirabayashi et al. | ........ | 385/16 |
| 6,422,761 B1 * | 7/2002 | Naghski et al. | ................ | 385/73 |
| 6,594,435 B2 * | 7/2003 | Tourne | ........................ | 385/136 |
| 7,033,084 B2 * | 4/2006 | Lappohn | ........................ | 385/73 |
| 7,251,388 B2 * | 7/2007 | Morris et al. | ................... | 385/14 |
| 7,269,321 B2 * | 9/2007 | Morris et al. | ................ | 385/115 |
| 7,792,397 B2 * | 9/2010 | Yamanouchi et al. | ......... | 385/14 |
| 2002/0176671 A1 * | 11/2002 | Tourne | ............................ | 385/88 |

(Continued)

FOREIGN PATENT DOCUMENTS
CA    2320683 A1 *    3/2002
(Continued)

*Primary Examiner* — Charlie Peng
*Assistant Examiner* — Peter Radkowski
(74) *Attorney, Agent, or Firm* — Finnegan, Henderson, Farabow, Garrett & Dunner, LLP

(57) ABSTRACT

An optical connector has a body, a mirror provided within the body, an optical waveguide path, and a linking section. The optical waveguide path extends from a first end face exposed on a part of the surface of the body, bending via the mirror up to a second end face exposed on a part of the surface of the body not parallel to the first end face. The linking section is formed so as to include the first end, face and has a mechanism linking the fixing member first end face to the second end face of the optical waveguide path of the fixing member.

24 Claims, 13 Drawing Sheets

U.S. PATENT DOCUMENTS

| | | | |
|---|---|---|---|
| 2004/0123457 A1* | 7/2004 | Ohta et al. | 29/844 |
| 2004/0213516 A1* | 10/2004 | Gordon | 385/32 |
| 2005/0089276 A1 | 4/2005 | Yoon et al. | |
| 2009/0162006 A1* | 6/2009 | Yamanouchi et al. | 385/14 |

FOREIGN PATENT DOCUMENTS

| | | | |
|---|---|---|---|
| CA | 2320684 A1 * | 3/2002 | |
| EP | 0 703 477 A1 | 3/1996 | |
| JP | 5-77954 | 10/1993 | |
| JP | 08046354 A * | 2/1996 | |
| JP | 8-271759 | 10/1996 | |
| JP | 9-197189 | 7/1997 | |
| JP | 11-202150 | 7/1999 | |
| JP | 2000-227529 | 8/2000 | |
| JP | 2000266959 A * | 9/2000 | |
| JP | 2003-329891 | 11/2003 | |
| SU | 1191859 A * | 11/1985 | |
| WO | WO 2007/043481 A1 | 4/2007 | |

* cited by examiner

MODULE HAVING A PLURALITY OF CIRCUIT BOARDS STACKED WITH A PRESCRIBED DISTANCE THEREBETWEEN AND OPTICAL CONNECTOR FOR THE SAME

CROSS-REFERENCE TO RELATED APPLICATIONS

This application is a national phase application of International Application No. PCT/IB2007/000792, filed Mar. 21, 2007, and claims the priority of Japanese Application No. 2006-078869, filed Mar. 22, 2006, the contents of both of which are incorporated herein by reference.

BACKGROUND OF THE INVENTION

1. Field of the Invention

The present invention relates to a module having a plurality of circuit boards stacked with a prescribed distance therebetween, in which an optical communication path is provided between the circuit boards. The present invention also relates to an optical connector providing an optical communication path that extends in a direction different from the axial direction of the optical communication path provided between the circuit boards.

2. Description of the Related Art

Modules are developed in which a plurality of circuit boards, onto which circuits made up of electronic and electrical components are built, are stacked with a prescribed distance therebetween. In this type of module, one circuit board and another circuit board are fixed via a fixing member to be mutually parallel. By stacking a plurality of circuit boards with intervening fixing members, it is possible to save space in the module compared to a case in which a plurality of circuit boards are disposed within one and the same plane. This type of module is used with the module enclosed in a housing or the like, for example when used in an on-vehicle information processing apparatus. There is a desire to transfer a large amount of information accurately between the stacked circuit boards. Japanese Utility Model Application Publication No. JP-U-5-77954 discloses a module having a light-emitting element provided on one circuit board and a light-receiving element provided on another circuit board that are disposed to be positioned in relative opposition in the stacking direction. In the art described in Japanese Utility Model Application Publication No. JP-U-5-77954, optical communication is implemented between circuit boards by the light-receiving element receiving an optical signal emitted by the light-emitting element. In the module described in Japanese Utility Model Application Publication No. JP-U-5-77954, an optical signal propagates in a space between the circuit boards.

In the module of Japanese Utility Model Application Publication No. JP-U-5-77954, it is difficult to achieve alignment in the stacking direction in the positional relationship between the light-emitting element and the light-receiving element. In this art, one circuit board and another circuit board are fixed by an intervening fixing member (called a supporting post in Japanese Utility Model Application Publication No. JP-U-5-77954). For this reason, if the fixing member and the light-emitting element are formed accurately with a pre-established positional relationship in the horizontal direction, and the fixing member and the light-receiving element are formed accurately with a pre-established positional relationship in the horizontal direction, it is possible to achieve positional alignment of the light-emitting element and the light-receiving element in the stacking direction. However, if either of the horizontal-directional position relationships is offset from the pre-established positional relationship in the horizontal direction, it is not possible to achieve alignment in the stacking direction. If circuit board expansion or contraction caused by a change in temperature or the like, the positional relationship between the light-emitting element and the light-receiving element changes, resulting in an offset from the positional relationship in which the light-emitting element and the light-receiving element are in mutual opposition. If the positional relationship between the light-emitting element and the light-receiving element is unstable, the transmission and reception of the optical signal is unstable. The stability of optical communication in the art of Japanese Utility Model Application Publication No. JP-U-5-77954 is poor. There is a need for the achievement of stable optical communication between stacked circuit boards.

In this type of module, it is necessary to provide an optical communication path between the outside and the optical communication path between circuit boards. This optical communication path is used when transmitting an optical signal from the outside towards the optical communication path between circuit boards and when transmitting an optical signal toward the outside from the optical communication path between circuit boards. In this type of module, it is often not possible to establish a sufficient space for installation. For this reason, the optical communication path provided between the outside and the optical communication path between circuit boards is often restricted with respect to installation space. It is therefore desirable that optical communication path provided between the outside and the optical communication path between circuit boards be able to cope with a restriction with regard to installation space.

SUMMARY OF THE INVENTION

The present invention provides an optical communication path that achieves stable optical communication between circuit boards. The present invention further provides an optical communication path from a direction that is different with respect to the axial direction of the optical communication path provided between circuit boards.

One aspect of the present invention provides an optical waveguide path on a fixing member fixing one circuit board to another circuit board for the propagation of an optical signal. This aspect of the present invention further provides an optical connector providing an optical communication path in a direction different from the axial direction of the fixing member.

The fixing member provided in the one aspect of the present invention fulfils the role of mechanically fixing one circuit board to another circuit board, and also the role of providing an optical communication path for propagation of an optical signal. The fixing member, unlike Japanese Utility Model Application Publication No. JP-U-5-77954, does not require a complex arrangement either for accurately establishing the positional relationship between the fixing member and the light-emitting element in the horizontal direction or for accurately establishing the positional relationship between the fixing member and the light-receiving element in the horizontal direction. Also, the fixing member uses an optical waveguide path formed inside the fixing member so that the optical communication function is maintained even if expansion or contraction of the circuit board is caused by temperature changes or the like. For this reason, by using the fixing member of the one aspect of the present invention, it is possible to accurately propagate information between the circuit boards.

The optical connector provided by the one aspect of the present invention has a mirror. The optical waveguide path extending within the optical connector bends as it passes through the mirror. Because of this, one end face of the optical waveguide path and the other end face thereof are exposed in different directions at the surface of the optical connector. The optical connector therefore provides an optical communication path in a direction different from the axial direction of the fixing member. The optical connector can provide an, optical communication path extending in various directions between the outside and the optical communication path between circuit boards. The optical connector reduces the space restrictions on the installation of the module and provides an optical communication path between the outside and the optical communication path between circuit boards.

By using the fixing member and the optical connector of the one aspect of the present invention, it is not only possible to achieve stable optical communication between stacked circuit boards, but also possible to implement a module providing an optical communication path between the outside and the optical communication path between the circuit boards.

The art of the present invention can be applied to optical signal transmission art utilizing an optical signal of either a single wavelength or multiple wavelengths. The scope of the art of this present invention is not restricted with respect to the type of optical signal.

One module of an aspect of the present invention has a plurality of circuit boards, at least one fixing member that fixes the adjacent circuit boards with a prescribed distance therebetween and also provides an optical communication path between the circuit boards, and an optical connector linking to the fixing member and providing an optical communication path in a direction different from the axial direction of the fixing member. The fixing member of the one aspect of the present invention has a body and an optical waveguide path extending therethrough. The optical connector has a body, a mirror provided within the body, and an optical waveguide path extending from a first end face exposed at one part of the surface of the body, bending via the mirror, up to a second end face exposed at another part of the surface of the body and non-parallel with respect to the first end face. The optical connector further has a linking section, formed so as to include the first end face, linking to the fixing member with the first end face optically coupled to the optical waveguide path of the fixing member. In this context, "optically coupled" is not limited to the case in which the first end face of the optical waveguide path of the optical connector is in physical contact with the end face of the optical waveguide path of the fixing member, but also includes the cases, for example, in which there is a prescribed distance therebetween, or another member intervening therebetween.

The fixing member created in the one aspect of the present invention has a body and an optical waveguide path extending through the body. The fixing member fixes a plurality of circuit boards with a prescribed distance therebetween. When the plurality of circuit boards are fixed by the fixing member, the optical waveguide path that extends through the body provides an optical communication path between the circuit boards. The fixing member can mechanically fix one circuit board to another circuit board with a prescribed distance therebetween. Additionally, the fixing member, using the optical waveguide path extending through the body, can provide an optical communication path extending between the circuit boards. The fixing member of the one aspect of the present invention can fix one circuit board to another circuit board to enable optical communication.

The optical connector created in the one aspect of the present invention, by causing the optical waveguide path extending within the optical connector to bend via a mirror, can cause the first end face of one optical waveguide path and the second end face of another to be exposed in different directions at the surface of the optical connector. By this means, the optical connector provides an optical communication path in a direction that is different from the axial direction of the fixing member.

The module of the one aspect of the present invention has a fixing member and an optical connector, by which the module achieves optical communication between stacked circuit boards and also provides an optical communication path between the outside and the optical communication path between the circuit boards.

The linking section of the optical connector in the one aspect of the present invention may have a mechanism that, when linking to the fixing member, allows the first end face to be optically coupled to the end face of the optical waveguide path of the associated fixing member at least at one angle selected from a plurality of angles with respect to a direction in which the first end face and the end face oppose to each other. This type of mechanism also encompasses a mechanism whereby the first end face of the optical waveguide path of the optical connector and the end face of the optical waveguide path of the fixing member are optically coupled so as to allow rotation about a direction in which the first end face and the end face oppose to each other.

When the first end face of the optical waveguide path of the optical connector and the end face of the optical waveguide path of the fixing member are coupled at an angle selected from the plurality of angles about a direction in which the first end face and the end face oppose to each other, the second end face of the optical waveguide path of the optical connector is exposed, facing the radial direction of the fixing member at an angle that is selected from the plurality of angles. The optical connector can provide an optical communication path between the outside and the optical communication path that can extend in a plurality of directions between the circuit boards.

The optical waveguide path of the fixing member and/or optical connector of the one aspect of the present invention may have a plastic fiber.

The plastic fiber is made of a material with flexibility for easy processing. If a plastic fiber is used, it is possible to form fixing members and/or optical connectors having various shapes.

The body of the fixing member of the one aspect of the present invention may have a first part with a large outer diameter and a second part with a small outer diameter, thereby forming a step surface between the first part and the second part. By causing the rear surface (or front surface) of a circuit board to come into contact with this step surface, it is possible to assemble the circuit board and the fixing member with a prescribed positional relationship. The prescribed distance between one circuit board and another circuit board can therefore be adjusted by the height of the first part having the large outer diameter.

The first part of the fixing member may have an insertion hole that accepts the second part of another fixing member. This insertion hole may extend along the direction of passage of the optical waveguide path from the end face of the first part. Additionally, the shape of the insertion hole may substantially coincide with the shape of the second part. In this case, when the second part of one fixing member is inserted into the insertion hole of another fixing member, the end face of the optical waveguide path of the one fixing member is optically coupled to the end face of the optical waveguide path of the other fixing member. In this context, "optically coupled" is not limited to the case in which the first end face of the optical waveguide path of the optical connector is in physical contact with the end face of the optical waveguide path of the fixing member, but also includes the cases, for example, in which there is a prescribed distance therebetween, or another member intervening therebetween.

When the shape of the insertion hole of the first part substantially coincides with the shape of the second part, it is possible to mate the second part of one fixing member into the insertion hole of another fixing member. Additionally, because the insertion hole of the first part extends in the insertion direction of the optical waveguide path, when the second part of one fixing member is inserted into the insertion hole of another fixing member, there is optical coupling between the optical waveguide path of the one fixing member with the optical waveguide path of the other fixing member. By doing so, it is possible to extend the optical waveguide path along a plurality of fixing members. Even if a plurality of fixing members are linked, it is possible to cause an optical signal to propagate along the plurality of fixing members.

The fixing member may have a first terminal formed on at least a part of an inner wall that defines the insertion hole of the fixing member. The fixing member may further have a second terminal formed on at least a part of an outer wall of the second part. The fixing member may additionally have a conductive wire, provided outside the optical waveguide path, electrically connecting the first terminal and the second terminal. In this case, when the second part of one fixing member is inserted into the insertion hole of another fixing member, the first terminal of the another fixing member is electrically connected to the second terminal of the one fixing member.

According to the foregoing fixing member, when the second part of one fixing member is inserted into the insertion hole of another fixing member, the second terminal of the one fixing member is connected to the first terminal of the another fixing member. By doing so, even in the case in which a plurality of fixing members are linked, each of the conductive wires of the plurality of fixing members is connected via the first terminal of one fixing member and the second terminal of another fixing member. The conductive wire electrically connected across a plurality of fixing members can supply a voltage to the plurality of circuit boards.

Also, a plurality of the sets of the first terminal, the second terminal, and the conductive wire may be formed on one fixing member. When a plurality of sets are formed, it is possible to supply a plurality of voltages.

The linking section of the optical connector of the present invention may have a protruding part having a shape substantially coinciding with the shape of the second part of the fixing member and/or a mating hole having a shape substantially coinciding with the shape of the insertion hole of the fixing member. If a protruding part is provided on the linking section, when the protruding part is inserted into the insertion hole of the fixing member, the end face of the optical waveguide path of the fixing member is optically coupled with the first end face of the protruding part. If a mating hole is provided in the linking section, when the mating hole accepts the second part of the fixing member, the end face of the optical waveguide path of the fixing member is optically coupled with the first end face of the mating hole.

According to the foregoing aspect, the linking section of the optical connector has a shape that is common to the second part and/or insertion hole of the fixing member. By doing so, it is possible to mate the optical connector and the fixing member using an arrangement as when a fixing member is mated to a fixing member. By adopting a common mating arrangement, it is possible to provide increased convenience for the user.

In the case in which the fixing member has the set of the first terminal, the second terminal, and the conductive wire, the optical connector of the one aspect of the present invention may have the following constitution.

The optical connector of the one aspect of the present invention may have, in the case in which the fixing member has a protruding part, a third terminal formed on at least a part of the outer wall of the protruding part, a fourth terminal formed on the surface of the body other than the protruding part, and a conductive wire provided outside the optical waveguide path to electrically connect the third terminal and the fourth terminal. In this case, when the protruding part is inserted into the insertion hole of the fixing member; the end face of the optical waveguide path of the fixing member is optically coupled with the first end face of the protruding part, and the first terminal of the fixing member is electrically connected to the third terminal of the protruding part.

The optical connector of the one aspect of the present invention may have, in the case in which the fixing member has an insertion hole, a fifth terminal formed on at least a part of the inner wall delineating the mating hole, a sixth terminal formed on the surface of the body other than the mating hole, and a conductive wire provided outside the optical waveguide path to electrically connect the fifth terminal and the sixth terminal. In this case, when the mating hole accepts the second part of the fixing member, the end face of the optical waveguide path of the fixing member is optically coupled with the first end face of the mating hole, and the second terminal of the fixing member is electrically connected to the fifth terminal of the mating hole.

By doing so, when the fixing member and the optical connector are linked, the conductive wire of the fixing member and the conductive wire of the optical connector are electrically connected to obtain a conductive wire extending along both the fixing member and the optical connector.

Apertures for passing the second part of the fixing member or the protruding part of the linking section of the optical connector are provided in the plurality of circuit boards in the one aspect of the present invention. These apertures may be shaped to substantially coincide in shape with either the second part or the protruding part of the linking section passing therethrough. The second part of the fixing member and the circuit board may have shapes that prevent mutual rotation about the axis of the fixing member.

This prevents mutual rotation between the fixing member and the circuit board, enabling reliable positioning between the circuit on the circuit board and the terminals on the fixing member.

The second part of the fixing member and the protruding part of the linking section may have a cylindrical shape. The insertion hole of the fixing member and the mating hole of the linking section of the optical connector may have shapes substantially coinciding with the cylindrical shape.

By doing so, the end face of the optical waveguide path of the fixing member and the first end face of the optical waveguide path of the optical connector are optically coupled and allowed to rotate with respect to a direction in which the end face and the first end face oppose to each other. The optical connector can provide an optical communication path extending in various directions between the outside and the optical communication path between circuit boards.

In the case in which the fixing member has the set of the first terminal, the second terminal, and the conductive wire, a plurality of the sets may be formed in the fixing member. Of these, at least one set may be for a ground potential and at least another may be for a power supply voltage.

By means of this fixing member, both the ground potential and the power supply voltage can be supplied to a plurality of circuit boards.

The fixing member may have a first reflecting device. The first reflecting device is provided inside the optical waveguide path and reflects an optical signal, which propagates within the optical waveguide path, toward outside the optical waveguide path. The fixing member may further have a light-receiving element. The light-receiving element is provided on the outside of the optical waveguide path, and converts an optical signal reflected by the first reflecting device to an electrical signal.

The first reflecting device and the light-receiving element can convert an optical signal propagating through the optical waveguide path to an electrical signal. The electrical signal converted by the first reflecting device and the light-receiving element is transferred to a circuit on the circuit board connected to the light-receiving element.

The first reflecting device may be a half mirror. In this case, the first reflecting device reflects a part of the optical signal propagating within the optical waveguide path and passes the remaining part.

Using a half mirror as the first reflecting device, the optical signal that has passed through the half mirror propagates to the optical waveguide path of another fixing member. If a half mirror is used as the first reflecting device, when the optical waveguide path is constructed to extend through a plurality of fixing members, it is possible to propagate an optical signal through a plurality of fixing members. When a half mirror is used as the first reflecting device, optical communication between a plurality of circuit boards is possible by using the optical waveguide path that extends through a plurality of fixing members.

A pair of half mirrors may be used as the first reflecting device. In this case, the first reflecting device reflects, toward the light-receiving element, a part of the optical signal that propagates through the optical waveguide path from one end to the other end and part of the optical signal that propagates through the optical waveguide path from the other end to the one end.

When a pair of half mirrors is used as the first reflecting device, optical signals propagating in both directions within the optical waveguide path can be converted to electrical signals by the light-receiving element. When a pair of half mirrors is used as the first reflecting device, it is possible to receive information from circuit boards provided on both sides.

An end face of a terminal for a connecting wire connected to the light-receiving element may be exposed at the surface of the fixing member. By doing so, it is possible to establish wiring to electrically connect the light-receiving element and the circuit board. The optical signal propagating through the optical waveguide path is converted to an electrical signal by the light-receiving element and transmitted to the circuit on the circuit board via this connecting wire.

The fixing member may have a light-emitting element. The light-emitting element is provided on the outside of the optical waveguide path, and converts an electrical signal to an optical signal. The fixing member may further have a second reflecting device. The second reflecting device is provided within the optical waveguide path, and reflects an optical signal from the light-emitting element toward inside the optical waveguide path.

The second reflecting device and the light-emitting element can supply an optical signal to the optical waveguide path. The second reflecting device and the light-emitting element can convert an electrical signal from the circuit on the circuit board connected to the light-emitting element to an optical signal and can supply the optical signal to the optical waveguide path.

The second reflecting device may be a half mirror. In this case, the second reflecting device reflects an optical signal from the light-emitting element toward inside the optical waveguide path and passes an optical signal propagating through the optical waveguide path. If a half mirror is used as the second reflecting device, it is possible to guide the optical signal from the light-emitting element to the optical waveguide path and also to pass another optical signal that arrives by propagation through the optical waveguide path.

A pair of half mirrors may be used as the second reflecting device. In this case, the second reflecting device reflects an optical signal from the light-emitting element toward one end of the optical waveguide path and also reflects an optical signal from the light-emitting element toward the other end of the optical waveguide path.

When a pair of half mirrors is used as the second reflecting device, it is possible to supply an optical signal from the light-emitting element toward both directions inside the optical waveguide path. When a pair of half mirrors is used as the second reflecting device, it is possible to send information toward circuit boards provided on both side.

An end face of a terminal for a connecting wire connected to the light-emitting element may be exposed at the surface of the fixing member. By doing so, it is possible to establish wiring to electrically connect the light-emitting element and the circuit board. The electrical signal from the circuit on the circuit board is transmitted via the connecting wire to the light-emitting element, and the optical signal converted by the light-emitting element is then supplied to the optical waveguide path.

Another module according to an aspect of the present invention has a plurality of circuit boards, a plurality of fixing members that fixes the plurality of circuit boards with a prescribed distance therebetween and provides an optical communication path between the circuit boards, and an optical connector linking to the fixing member and providing an optical communication path in a direction different from the axial direction of the fixing members.

The optical connector has a body, a mirror provided within the body, and an optical waveguide path extending from a first end face exposed at one part of the surface of the body, bending via the mirror, up to a second end face exposed at one part of the surface of the body and non-parallel with respect to the first end face. The optical connector further has a linking section, formed so as to include the first end face, linking to the fixing member with the first end face optically coupled to the end face of optical waveguide path of the fixing member.

The plurality of fixing members have four types of fixing members. The first fixing member has a body, an optical waveguide path, a light-receiving element receiving a part of an optical signal propagating through the optical waveguide path and converting the optical signal to an electrical signal, and a light-emitting element emitting an optical signal to be introduced into the optical waveguide path. The second fixing member has a body, an optical waveguide path, and a light-receiving element receiving a part of an optical signal propagating through the optical waveguide path and converting the optical signal to an electrical signal. The third fixing member has a body, an optical waveguide path, and a light-emitting element emitting an optical signal to be introduced into the optical waveguide path. The fourth fixing member has a body and an optical waveguide path. The first fixing member to the fourth fixing member have a common shape, make connections from one fixing member to another fixing member, with a circuit board sandwiched therebetween, and can make an optical coupling between an end face of the optical waveguide path of one fixing member to an end face of the optical waveguide path of another fixing member. The first fixing member to the fourth fixing member are selected appropriately for the function of the circuit board. The first fixing member is connected to a circuit board that sends and receives a signal with other circuit boards. The second fixing member is connected to a circuit board that receives a signal from another circuit board. The third fixing member is connected to a circuit board that sends a signal to another circuit board. The fourth fixing member is connected to a circuit board that neither sends a signal to nor receives a signal from another circuit board.

By arbitrarily using one or combination of the first fixing member to the fourth fixing member, it is possible to fix a plurality of circuit boards having diverse functions with a prescribed distance therebetween. Furthermore, it is possible to configure an optical communication path between the plurality of circuit boards and to send and receive information therebetween.

An optical waveguide path is provided in the fixing member provided by the aspect of the present invention. Using the optical waveguide path it is possible to propagate an optical signal between the circuit boards. By means of the fixing member, by fixing one circuit board to another circuit board using the fixing member, it is possible to configure an optical waveguide path for propagating an optical signal. For this reason, the fixing member can perform accurate transfer of information between the circuit boards, using the optical signal as a medium.

The optical connector provided by the aspect of the present invention has a mirror. The optical waveguide path extending within the optical connector is bent by the mirror. The result is that one end face of the optical waveguide path and the other end face thereof are exposed in different directions at the surface of the optical connector. The optical connector therefore provides an optical communication path in a direction different from the axial direction of the fixing member.

By using the fixing member and the optical connector of the aspect of the present invention, it is possible to achieve stable optical communication between stacked circuit boards, and to obtain a module with an optical communication path between the outside and the optical communication path between the circuit boards.

BRIEF DESCRIPTION OF THE DRAWINGS

The foregoing and further objects, features, and advantages of the invention will become apparent from the following description of preferred embodiments with reference to the accompanying drawings, wherein like numerals are used to represent like elements, and wherein.

DETAILED DESCRIPTION OF THE PREFERRED EMBODIMENTS

The features of the present invention are described below. The material used in the optical waveguide path is not particularly restricted. Materials such as a plastic fiber and a glass fiber are typically used. Because the optical signal propagation distance is short, it is desirable that an easy-to-process plastic fiber be used. The type of optical signal is not particularly restricted. It is possible to use an optical signal having either a single wavelength or multiple wavelengths. In the case of using a multiple-wavelength optical signal, it is desirable that a multi-layer dielectric film or diffraction grating type mixer/divider or the like is used as the first reflecting device and/or the second reflecting device in order to discriminate between the plurality of wavelengths.

Figure 1:
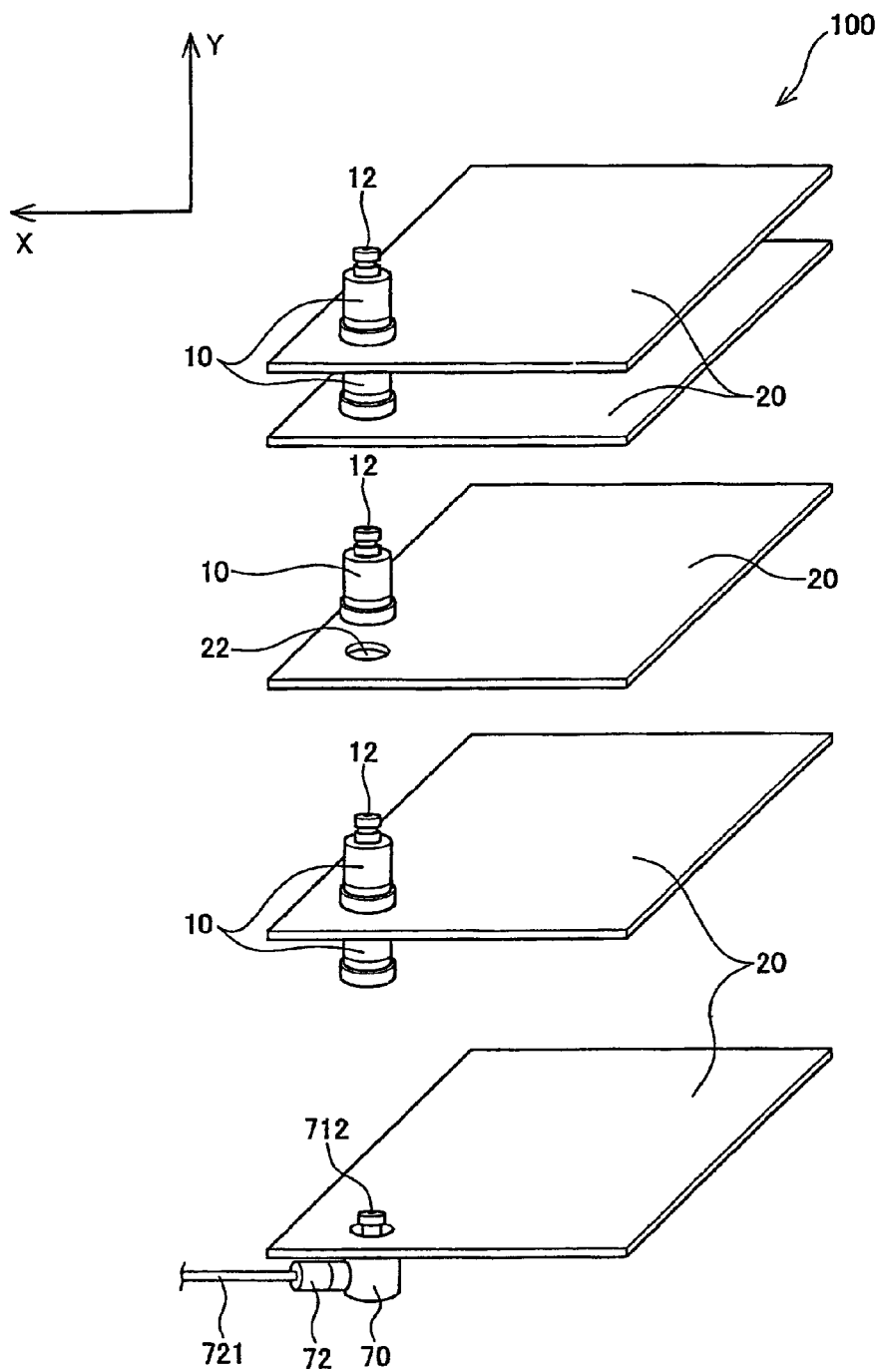
FIG. 1 shows a simplified view of the configuration of a module.

FIG. 1 shows a simplified view of the configuration of a module 100. The module 100 has a plurality of substantially square circuit boards 20, fixing members 10 that fix the plurality of circuit boards 20 and provide an optical communication path between the circuit boards 20, and an optical connector 70 that links to the fixing member 10 and provides an optical communication path in a direction (X direction) that is different from the axial direction (Y direction) of the fixing member 10. The plurality of circuit boards 20 are stacked with a prescribed distance therebetween. One circuit board 20 and another circuit board 20 are fixed in parallel with a prescribed distance therebetween, via an intervening fixing member 10. The optical connector 70 links an external connector 72 provided on the outside of the module 100 with the fixing member 10. In FIG. 1, for ease of understanding a circuit board 20 and fixing member 10 before mounting are also illustrated. The module 100 is enclosed in a housing or the like and used in an on-vehicle information processing apparatus.

The circuit board 20 has a circuit (not shown) made up of electronic and electrical components and the like, and an aperture 22 formed in the vicinity of a corner. The aperture 22 passes through the circuit board 20 from the front surface to the rear surface, and is substantially circular when viewed from a direction perpendicular to the plane thereof. One part of the fixing member 10 is inserted into the aperture 22 of the circuit board 20. A fixing member 10 links to another fixing member 10 in the axial direction (Y direction) via the aperture 22. The aperture 22 is formed in a common position on the plurality of circuit boards 20. For this reason, when the module 100 is viewed from a direction perpendicular to the plane thereof, the contours of the stacked plurality of circuit boards 20 coincide. The circuit boards 20 are sandwiched between fixing member 10 from above and below. Alternatively, the circuit board 20 and the fixing member 10 may be fixed via a socket.

The fixing member 10 fulfils the role of mechanically fixing one circuit board 20 to another circuit board 20. The fixing member 10, as described below, has an optical waveguide path 12 extending in the axial direction. For this reason, when a fixing member 10 is linked to another fixing member 10, it also fulfils the role of providing an optical waveguide path 12 for the propagation of an optical signal between circuit boards 20.

The optical connector 70 is provided at the outermost circuit board 20. A part of the optical connector 70 is inserted into the aperture 22 of the circuit board 20. The optical connector 70 is linked to the fixing member 10 via the aperture 22 in the axial direction (Y direction). The optical connector 70 is linked to the external connector 72 in the X direction. The optical connector 70, as described below, has an optical waveguide path 712 that bends. By linking the fixing member 10 and the external connector 72, the optical connector 70 provides an optical waveguide path 712 that bends, between the optical waveguide path 12 of the fixing member 10 and optical waveguide path 721 of the external connector 72.

Figure 2:
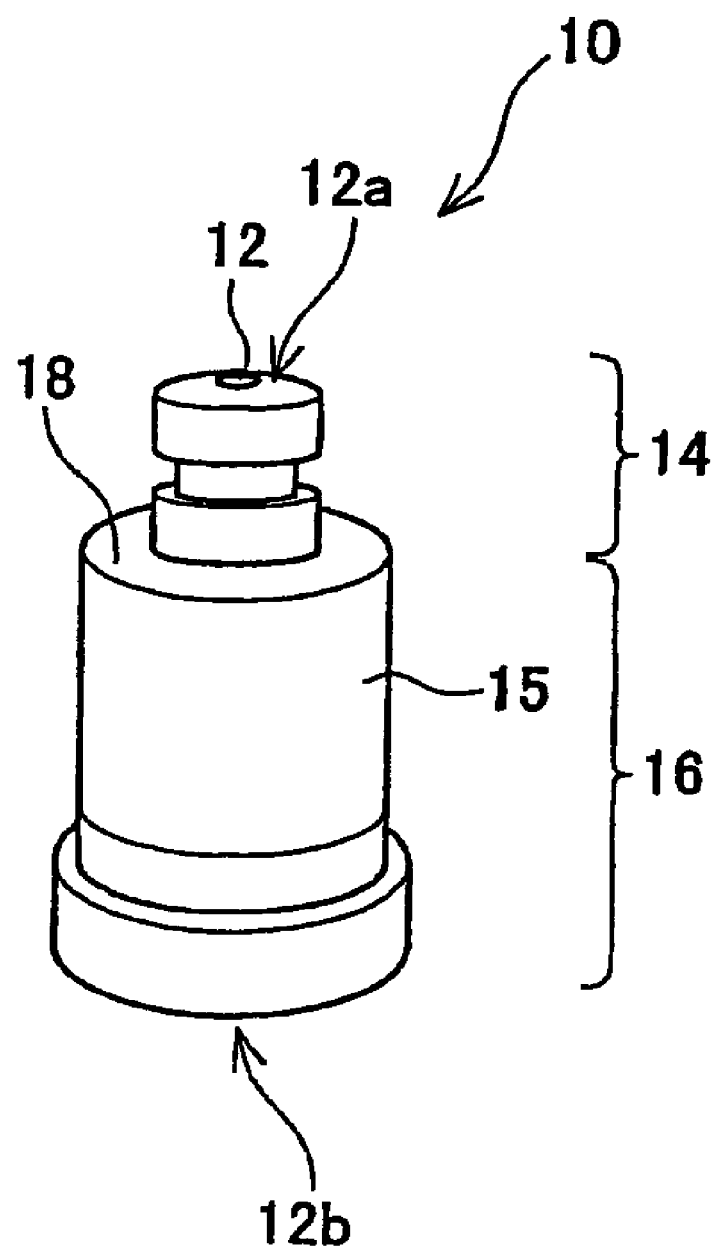
FIG. 2 shows a simplified enlarged perspective view of a fixing member.

The fixing member 10 will now be described. FIG. 2 shows a simplified enlarged perspective view of the fixing member 10. The fixing member 10 has a body 15 and an optical waveguide path 12 extending through the body 15. The optical waveguide path 12 has a first end face 12a formed on one end in the passage direction (up-down direction in the drawing) and a second end face 12b formed on the other end in the passage direction (refer to FIG. 3 and FIG. 4). The first end face 12a is exposed on one end face of the body 15. The second end face 12b is exposed on the other end face of the body 15. The optical waveguide path 12 has a plastic fiber. Because the plastic fiber has flexibility, the use of plastic fiber enables fixing members 10 of various shapes to be obtained.

The body 15 of the fixing member 10 has a first part 16 with a large outer diameter and a second part 14 with a small outer diameter. The first part 16 can be thought of as having an outer diameter that is relatively large in the overall fixing member 10. The second part 14 can be through of as having an outer diameter that is relatively small in the overall fixing member 10. A step surface 18 is formed between the first part 16 and the second part 14 that have different outer diameters. The outer diameter of the second part 14 is adjusted to be smaller than the diameter of the aperture 22 of the circuit board 20 shown in FIG. 1. The outer diameter of the first part 16 is adjusted to be larger than the diameter of the aperture 22 of the circuit board 20 shown in FIG. 1. By doing so, the second part 14 of the fixing member 10 can pass through the aperture 22 of the fixing member 10. The first part 16 of the fixing member 10, however, cannot pass through the aperture 22 of the circuit board 20. Therefore, when the fixing member 10 is inserted into the aperture 22 of the circuit board 20, the rear surface of the circuit board 20 makes contact with the step surface 18 of the fixing member 10. Another fixing member 10 is linked to the second part 14 that protrudes from the aperture 22 of the circuit board 20, thereby linking one fixing member 10 with another fixing member 10, as will be described below. By doing so, the circuit board 20 is sandwiched between one fixing member 10 and another fixing member 10. The distance between one circuit board 20 and another circuit board 20 can be adjusted by the height of the first part 16.

Figure 3:
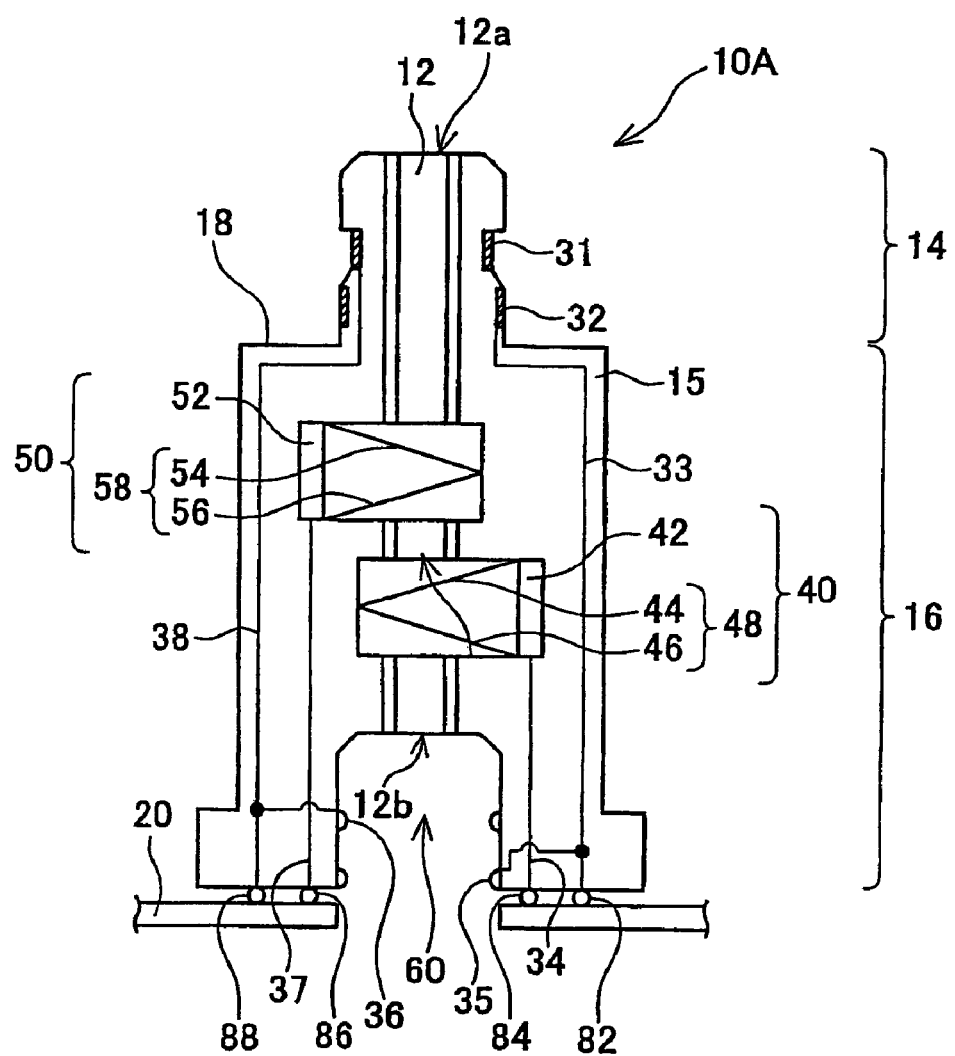
FIG. 3 shows a simplified view of the cross-section of a fixing member having a light-receiving section and a light-emitting section.
Figure 4:
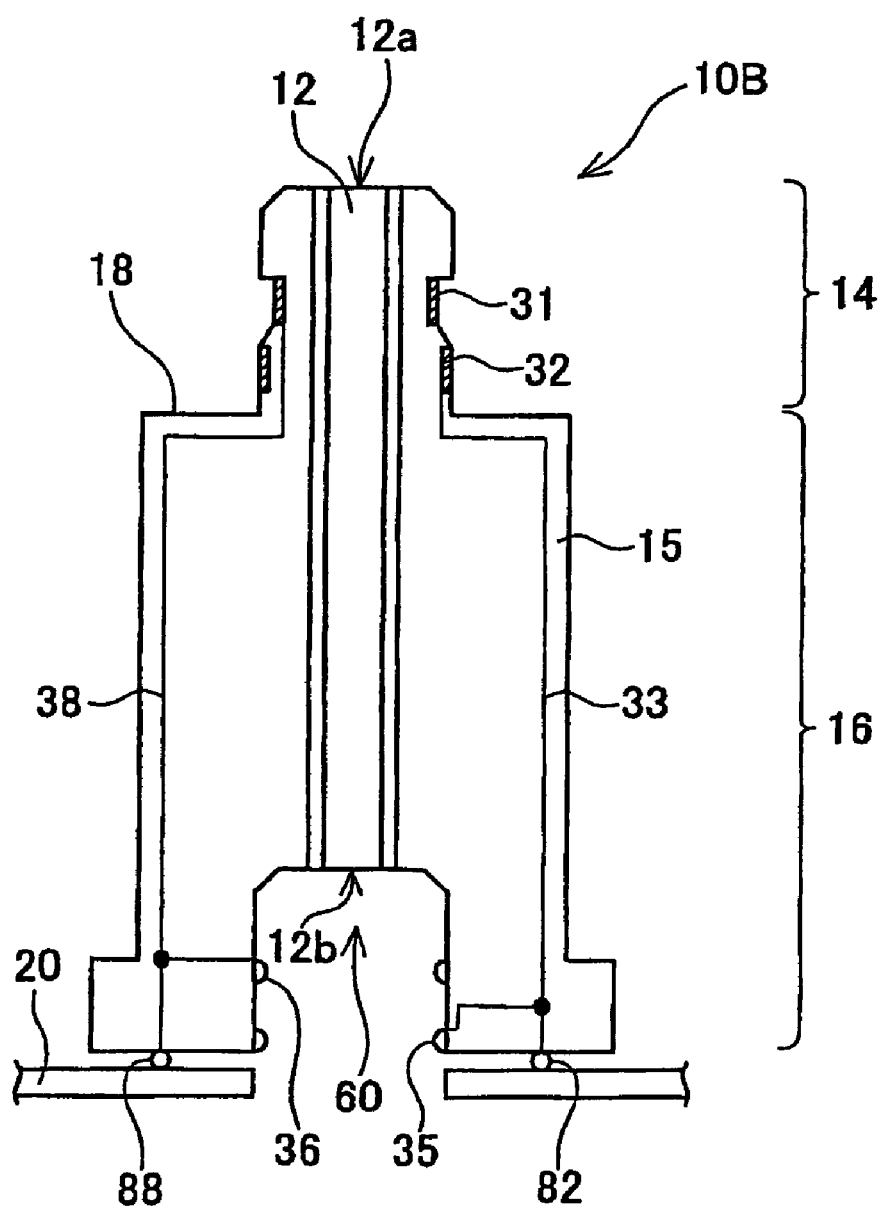
FIG. 4 shows a simplified view of the cross-section of a fixing member without a light-receiving section and a light-emitting section.

A plurality of types of fixing members 10 are available. FIG. 3 and FIG. 4 show simplified cross-sectional views of typical fixing members 10A and 10B. The first type of fixing member 10A shown in FIG. 3 has a light-receiving section 50 and a light-emitting section 40. The second type of fixing member 10B shown in FIG. 4 does not have the light-receiving section 50 or the light-emitting section 40. To distinguish the fixing member 10 and the individual functions of each fixing member 10, the reference numerals 10A and 10B will be used. In referring to the fixing member 10 without distinction between the individual functions, the reference numeral 10 will be used. The module 100 of this embodiment performs optical communication using an optical signal of a single wavelength. Therefore, wavelength of the light received by the light-receiving section 50 is equal to the wavelength of the light emitted by the light-emitting section 40.

The first type of fixing member 10A will be described first. As shown in FIG. 3, the first type of fixing member 10A has a light-receiving section 50 and a light-emitting section 40. The light-receiving section 50 has a first reflecting device 58 and a light-receiving element 52. The first reflecting device 58 has a pair of half mirrors 54, 56 providing within the optical waveguide path 12. The half mirrors 54, 56 are provided to incline with respect to the direction of passage of the optical waveguide path 12 (up-down direction in drawing). The half mirror 54 reflects part of the optical signal propagated within the optical waveguide path 12 upwardly in the drawing and passes the remaining part. The part of optical signal that is reflected by the half mirror 54 is converted to an electrical signal by the light-receiving element 52. The optical signal propagated within the half mirror 54 can be received by the light-receiving element 50 provided in another fixing member 10. The half mirror 56 reflects part of the optical signal that passes through the optical waveguide path 12 downwardly in the drawing and passes the remaining part. The part of the optical signal that is reflected by the half mirror 56 is converted to an electrical signal by the light-receiving element 52. The optical signal that passes through the half mirror 56 can be received by the light-receiving element 50 that is provided in another fixing member 10. Optical signals that bidirectionally propagate within the optical waveguide path 12 can be guided to the light-receiving element 52 by the pair of half mirrors 54, 56. If necessary, one of the pair of half mirrors may be eliminated. In this case, of the optical signals propagating within the optical waveguide path 12, it is possible to receive Only an optical signal propagating in a selected direction.

The light-receiving element 52 is provided in the optical waveguide path 12 at a position that does not physically block an optical signal propagating through the optical waveguide path 12. The light-receiving element 52 and the optical waveguide path 12 are optically coupled via the pair of half mirrors 54, 56. A semiconductor photoelectric conversion device is used for the light-receiving element 52. A first signal wire 37 is electrically connected to the light-receiving element 52 to extract a converted electrical signal. The first signal wire 37 passes through the fixing member 10 and extends to the lower end face thereof, the end part thereof being exposed at the lower end face of the fixing member 10. The first signal wire 37 is electrically connected via a light-receiving element signal terminal 86 to a circuit provided on the circuit board 20. A sheet-like metal terminal or springy metal terminal or the like is used as the light-receiving element signal terminal 86. By doing so, the electrical signal converted by the light-receiving element 52 is transmitted to the circuit on the circuit board 20 via the first signal wire 37 and the light-receiving element signal terminal 86. In practice, the first signal wire 37 often has two signal wires, for an anode and a cathode. Therefore, the light-receiving element signal terminal 86 also often has two light-receiving element signal terminals. In this embodiment, to simplify the drawing, only one signal wire and one light-receiving element signal terminal are shown.

The light-emitting section 40 has a light-emitting element 42 and a second reflecting device 48. The light-emitting element 42 is provided outside the optical waveguide path 12 at a position that does not physically block an optical signal propagating through the optical waveguide path 12. The light-emitting element 42 and the optical waveguide path 12 are optically coupled via a pair of half mirrors 44, 46. A semiconductor laser device is used as the light-emitting element 42. A second signal wire 34 is electrically connected to the light-emitting element 42 to input an electrical signal from the circuit provided on the circuit board 20. The second signal wire 34 passes through the fixing member 10 and extends to the lower end face thereof, the end part thereof being exposed at the lower end face of the fixing member 10. The second signal wire 34 is electrically connected via a light-emitting element signal terminal 84 to a circuit provided on the circuit board 20. A sheet-like metal terminal or springy metal terminal or the like is used as the light-emitting element signal terminal 84. An electrical signal from the circuit on the circuit board 20 is input to the light-emitting element 42 via the light-emitting element signal terminal 84 and the second signal wire 34. The light-emitting element 42 generates an optical signal according to the input electrical signal. In practice, the second signal wire 34 often has two signal wires, for an anode and a cathode. Therefore, the light-emitting element signal terminal 84 also often has two light-emitting element signal terminals. In this embodiment, to simplify the drawing, only one signal wire and one light-emitting element signal terminal are shown.

The second reflecting device 48 has a pair of half mirrors 44, 46 provided within the optical waveguide path 12. The half mirrors 44, 46 are provided to incline with respect to the direction of passage of the optical waveguide path 12 (up-down direction in the drawing). The half mirror 44 reflects the optical signal from the light-emitting element 42 and guides the signal to the optical waveguide path 12. The optical signal reflected by the half mirror 44 propagates within the optical waveguide path 12 from the top downward as shown in the drawing. The half mirror 44 can pass at least a part of the optical signal from another fixing member 10. For this reason, an optical signal from another fixing member 10 can pass through the half mirror 44 and propagate toward yet another fixing member 10. The half mirror 46 reflects the optical signal from the light-emitting element 42 and guides the signal to the optical waveguide path 12. The optical signal reflected by the half mirror 46 propagates within the optical waveguide path 12 from the bottom upward as shown in the drawing. The half mirror 46 can pass at least a part of the optical signal from another fixing member 10. For this reason, an optical signal from another fixing member 10 can pass through the half mirror 46 and propagate toward yet another fixing member 10. By using the pair of half mirrors 44, 46 it is possible to supply an optical signal from the light-emitting element 42 in both directions within the optical waveguide path 12. If necessary, it is possible to eliminate one of the pair of half mirrors 44, 46, in which case by selecting one of the pair of half mirrors 44, 46 it is possible to supply an optical signal in the selected direction only.

Unless specifically noted, the constituent elements described below are provided in a plurality of types of fixing members 10 in common. The common constituent elements will be described with reference to the fixing member 10A shown in FIG. 3.

As shown in FIG. 3, the first part 16 has an insertion hole 60 that accepts the second part 14 of another fixing member 10. The insertion hole 60 extends along the passage direction (up-down direction in the drawing) of the optical waveguide path 12, from the lower end face of the first part 16. The second end face 12b of the optical waveguide path 12 is exposed in the insertion hole 60. The shape of the insertion hole 60 is formed to substantially coincide with the shape of the second part 14. When the shape of the insertion hole 60 of the first part 16 and the shape of the second part 14 coincide it is possible to mate the insertion hole 60 of the first part 16 with the second part 14 of another fixing member 10. It is possible to use a variety of techniques in the arrangement of linking the insertion hole 60 of the first part 16 with the second part 14 of another fixing member 10. For example, such methods include mating by using shapes, mating by using a physical force as from a magnet or the like, and mating by a force from a spring or the like. Additionally, because the insertion hole 60 of the first part 16 extends along the passage direction of the optical waveguide path 12, when the second part 14 of another fixing member 10 is mated with the insertion hole 60 of the first part 16, optical coupling is made between the second end face 12b of the optical waveguide path 12 exposed in the insertion hole 60 of the first part 16 and the first part 12a of the optical waveguide path 12 exposed at the end face of the second part 14 of the other fixing member 10. Thus, by mating the insertion hole 60 of the first part 16 with the second part 14 of another fixing member 10, it is possible to extend the optical waveguide paths 12 of individual fixing members 10 across a plurality of fixing members 10. Even if coupling is done between a plurality of fixing members 10, by using the continuously linked optical waveguide paths 12, it is possible to propagate an optical signal to a plurality of fixing members 10.

As shown in FIG. 3, the fixing member 10 has a ground wire 33 for a ground potential and a power supply wire 38 for a power supply voltage. One end of the ground wire 33 is electrically connected to a first ground terminal 35 formed on the inner wall that defines the insertion hole 60 of the first part 16. The other end of the ground wire 33 is electrically connected to a second ground terminal 32 formed on the outer wall of the second part 14. The first ground terminal 35 is formed to pass around the inner wall delineating the insertion hole 60 in the circumferential direction. The second ground terminal 32 is formed to pass around the outer wall of the second part 14 in the circumferential direction. Sheet-like metal terminals or springy metal terminals or the like are used as the first ground terminal 35 and the second ground terminal 32. The ground wire 33 is provided on the outside of the optical waveguide path 12, and passes through the body 15 in the axial direction. The ground wire 33 is split, one part of which being exposed at the bottom end face of the fixing member 10. One part of the ground wire 33 is electrically connected via a board ground terminal 82 to the circuit provided on the circuit board 20. A sheet-like metal terminal or springy metal terminal or the like is used as the board ground terminal 82.

One end of the power supply wire 38 is electrically connected to a first power supply terminal 36 provided on the inner wall delineating the insertion hole 60 of the first part 16. The other end of the power supply wire 38 is electrically connected to a second power supply terminal 31 provided on the outer wall of the second part 14. The first power supply terminal 36 is formed to pass around the inner wall delineating the insertion hole 60 in the circumferential direction. The second power supply terminal 31 is formed to pass around the outer wall of the second part 14 in the circumferential direction. Sheet-like metal terminals or springy metal terminals or the like are used as the first power supply terminal 36 and the second power supply terminal 31. The power supply wire 38 is provided on the outside of the optical waveguide path 12 and extends through the body 15 in the axial direction. The power supply wire 38 is split, one part of which being exposed at the bottom end face of the fixing member 10. One part of the power supply wire 38 is electrically connected via a board power supply terminal 88 to the circuit provided on the circuit board 20. A sheet-like metal terminal or springy metal terminal or the like is used as the board power supply terminal 88.

The first ground terminal 35 and the first power supply terminal 36 formed on the inner wall that defines the insertion hole 60 of the first part 16 are offset in the axial direction of the fixing member 10. For this reason, the first ground terminal 35 and the first power supply terminal 36 are electrically insulated and separated. The second ground terminal 32 and the second power supply terminal 31 formed on the outer wall of the second part 14 are offset in the axial direction of the fixing member 10. For this reason, the second ground terminal 32 and the second power supply terminal 31 are electrically insulated and separated.

In the fixing member 10, when the second part 14 of another fixing member 10 is mated with the insertion hole 60 of the first part 16, the first ground terminal 35 makes contact with the second ground terminal 32 of the another fixing member 10. In addition, the first power supply terminal 36 and the second power supply terminal 31 of the another fixing member make contact. The result is that, even in the case in which a plurality of circuit boards are linked, the individual ground wires 33 of the plurality of fixing members 10 are electrically connected via the first ground terminal 35 and the second ground terminal 32. Each power supply wires 38 of the plurality of fixing members 10 are also electrically connected via the first power supply terminal 36 and the second power supply terminal 31. For this reason, when the ground potential is supplied to the ground wire 33 from the first ground terminal 35, the second ground terminal 32, and the board ground terminal 82, the ground potential on the ground wire 33 is maintained at a level that is in common throughout the plurality of mated fixing members 10. The ground potential is supplied to the circuit boards 20 via the board ground terminals 82. It is therefore possible to supply a common level of ground potential to a plurality of circuit boards 20. When the power supply voltage is supplied to the power supply wire 38 from the first power supply terminal 36, the second power supply terminal 31, and the board power supply terminal 88, the power supply voltage on the power supply wire 38 is maintained at a level that is in common throughout the plurality of mated fixing members 10. That power supply voltage is supplied to the circuit boards 20 via the board power supply terminals 88. It is therefore possible to a common level of power supply voltage to a plurality of circuit boards 20. The board ground terminal 82 and the board power supply terminal 88 may be eliminated from a part of the fixing members 10. In this case, the circuit on the circuit board 20 can be operated from a ground potential and a power supply voltage that are independent from the ground wire 33 and the power supply wire 38.

FIG. 4 shows the cross-section of the second type of fixing member, 10B. Constituent elements in FIG. 4 that are the same as in the first type of fixing member, 10A, shown in FIG. 3, are assigned the same reference numerals. As shown in FIG. 4, the second type of fixing member 10B is not provided with a light-emitting section 40 and the light-receiving section 50. The second type of fixing member 10B has an optical waveguide path 12, and can propagate an optical signal. The second type of fixing member 10B has a ground wire 33 and a power supply wire 38, enabling supply to the circuit board 20 of the ground potential and the power supply voltage. For example, a circuit board 20 without a communication function can be provided in the module 100. In such a case, it is desirable to use the second type of fixing member 10B. The second type of fixing member 10B does not perform exchange of information with a circuit board 20. The second type of fixing member 10B bypasses an optical signal from another fixing member 10, and can also pass that optical signal to another fixing member 10. The second type of fixing member 10B, in the case in which it is necessary to supply the ground potential and the supply voltage to the circuit board 20, can supply the ground potential and power supply voltage to the circuit board 20 via the board ground terminal 82 and the board power supply terminal 88. In addition to the first type of fixing member 10A and the second type of fixing member 10B, it is possible to use a fixing member that has alight-receiving section 50 but does not have a light-emitting section 40, or a fixing member that has a light-emitting section 40 but does not have a light-receiving section 50. This plurality of types of fixing members 10 can have a common outer shape. Using the plurality of types of fixing members 10, it is possible to configure a module 100 by stacking arbitrary types of circuit boards 20.

Figure 5:
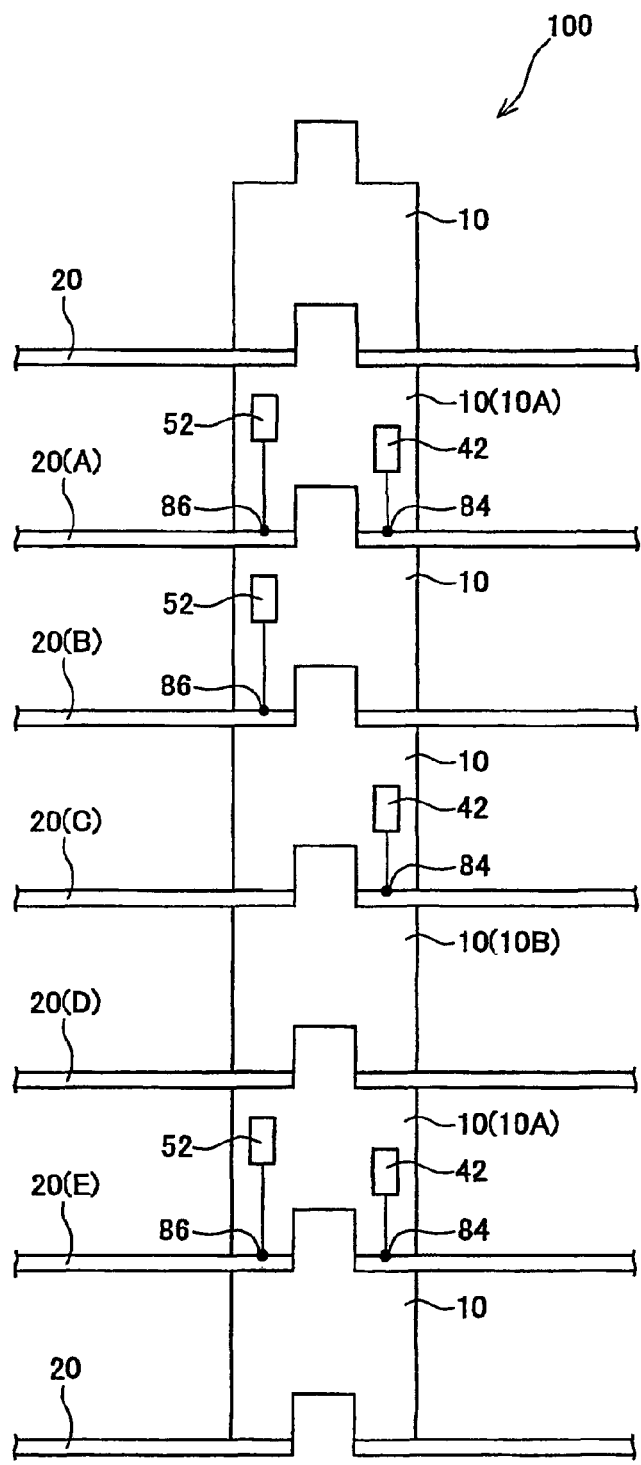
FIG. 5 shows a simplified view of the cross-section of a module using a plurality of types of fixing members.

FIG. 5 shows an example of configuring a module 100 in which a plurality of circuit boards 20 are stacked. To aid in understanding the types of fixing members 10, the drawing shows only the light-receiving elements 52 and the light-emitting elements 42 in the fixing members 10. The plurality of types of fixing members 10 are selected appropriately for the functions required of the circuit boards 20.

The circuit boards 20(A) and 20(E) are required to have the function of sending and receiving an optical signal to and from another circuit board 20. In this case, a fixing members 10 (10A) having both a light-emitting element 52 and a light-receiving element 42 is used for the circuit boards 20(A) and 20(E). The circuit board 20(B) is required to have the function of receiving an optical signal from another circuit board 20. In this case, a fixing member 10 having only a light-receiving element 52 is used for the circuit board 20(B). The circuit board 20(C) is required to have the function of sending an optical signal to another circuit board 20. In this case, a fixing member 10 having only a light-emitting element 42 is used for the circuit board 20(C). The circuit board 20(D) is not required to have functions of sending and receiving optical signals with other circuit boards. In this case, a fixing member 10 (10B) with neither the light-receiving element 52 nor the light-emitting element 42 is used for the circuit board 20(D).

By combining a plurality of types of fixing members 10, it is possible to stack a plurality of circuit boards 20 having diverse functions, with a prescribed distance therebetween. The fixing members 10 additionally configure an optical communication path between the plurality of circuit boards 20, thereby enabling sending and receiving of information.

As noted above, the fixing member 10 features an optical waveguide path 12 for propagating an optical signal. The fixing member 10 not only serves to mechanically fix one circuit board 20 to another circuit board 20, but also serves as an optical communication path for propagation of an optical signal. The fixing member 10 not only mechanically fixes one circuit board 20 to another circuit board 20, but also provides an optical waveguide path 12 for propagating an optical signal between the circuit boards 20. Even if a plurality of fixing members 10 are used to stack a plurality of circuit boards 20, the optical waveguide paths 12 of the fixing members 10 are optically coupled, and an optical waveguide path 12 extending across the plurality of fixing members 10 is provided. The light-receiving section 50 and the light-emitting section 40 provided in the fixing member 10 receive optical signals propagating through the optical waveguide path 12 and send optical signals to the optical waveguide path 12. If the optical waveguide path 12 uses the light-receiving section 50 and the light-emitting section 40 to send and receive an optical signal, it is possible to send and receive information between a plurality of circuit boards 20. Also, if the light-receiving sections 50 and light-emitting sections 40 are integrated into the fixing member 10 as in this embodiment, it is not necessary to accurately establish the positional relationship between the light-receiving element 52 and the light-emitting element 42. For this reason, if one fixing member 10 is linked to another fixing member 10, it is possible to stably send and receive an optical signal between the light-receiving section 50 and the light-emitting section 40. By providing an optical waveguide path 12 inside the fixing member 10, even a change in temperature or the like causes expansion or contraction of the circuit board 20, it is possible to maintain a stable optical communication function. For this reason, the fixing member 10 enables accurate transfer of information to a plurality of circuit boards 20, using an optical signal as a medium. By using a plurality of types of fixing members 10 with optical waveguide paths 12, it is possible to perform accurate transfer of information between a plurality of types of circuit boards 20.

Figure 6:
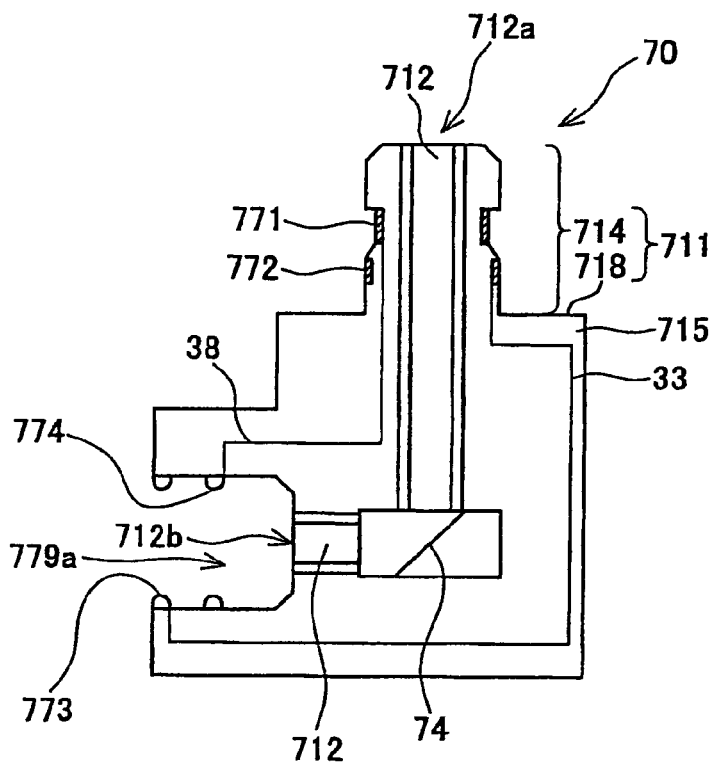
FIG. 6 shows a schematic view of the cross-section of an optical connector.
Figure 7:
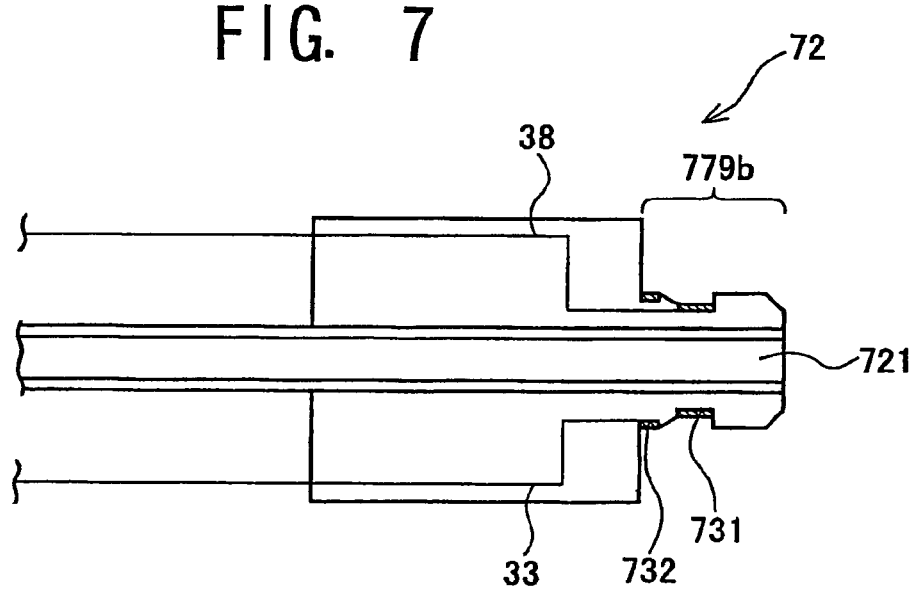
FIG. 7 shows a schematic view of the cross-section of an external connector.
Figure 8:
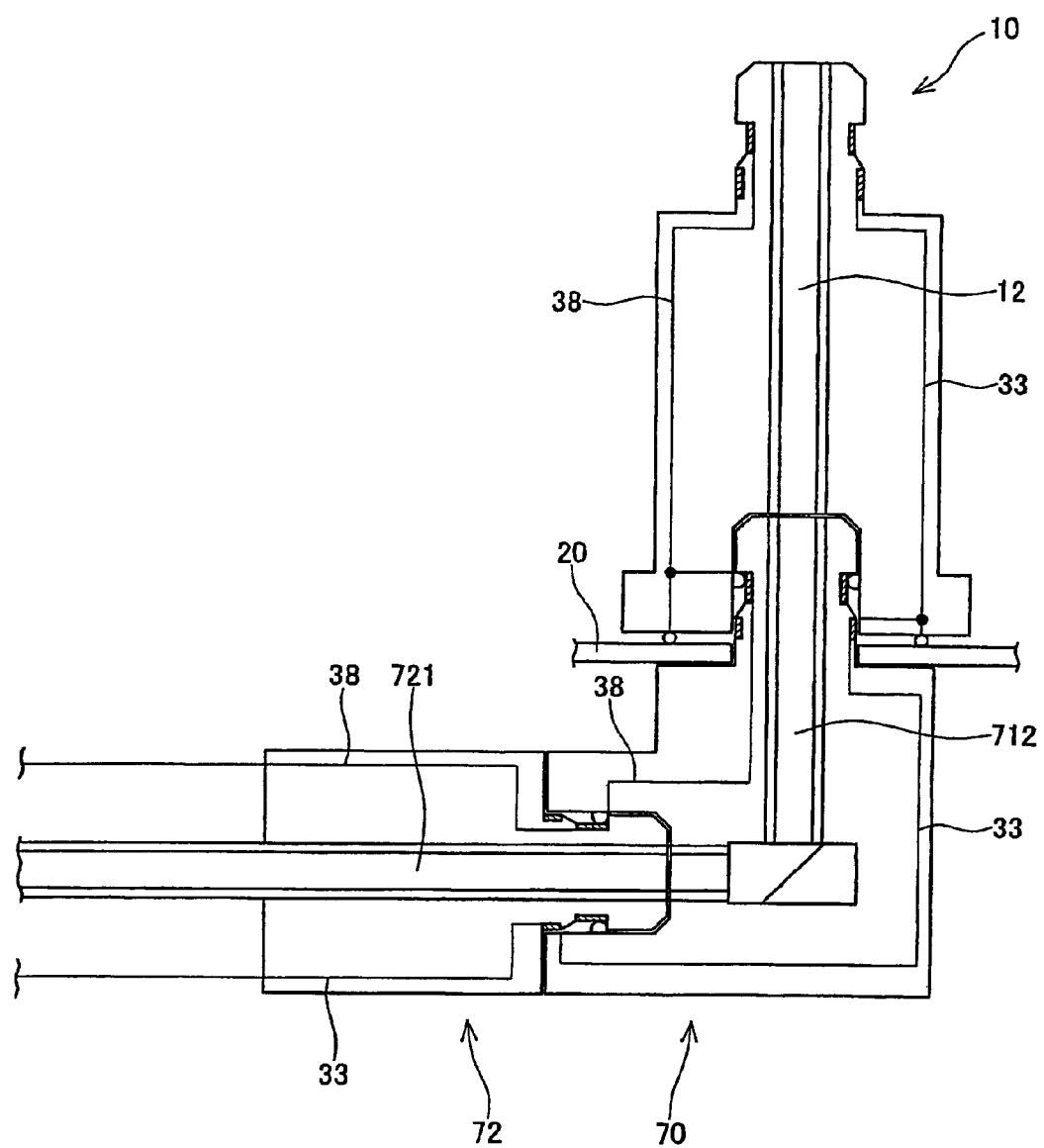
FIG. 8 shows the linked condition between a fixing member, an optical connector, and an external connector.

The optical connector 70 will now be described. FIG. 6 shows a schematic view of the cross-section of the optical connector 70. FIG. 7 shows a schematic view of the cross-section of the external connector 72. FIG. 8 shows the linked condition between a fixing member 10, an optical connector 70, and an external connector 72. In the module 100, it is often not possible to establish a sufficient space for installation. For this reason, when providing an optical communication path between the fixing member 10 and the external connector 72, it is useful to use the optical connector 70 to link the fixing member 10 and the external connector 72 at various angles.

As shown in FIG. 6, the optical connector 70 has a body 715, a mirror 74 provided inside the body 715, and an optical waveguide path 712 extending through the body 715. The optical waveguide path 712 has a first end face 712a formed on one end, and a second end face 712b formed on the other end. The first end face 712a is formed on a part of the surface of the body 715 and is exposed to the outside. The second end face 712b is formed on a part of the surface of the body 715 that is non-parallel with the surface on which the first end face 712a is formed, and is exposed to the outside. The optical waveguide path 712 extends from the first end face 712a, bending via the mirror 74, up to the second end face 712b. The use of the mirror 74 is effective in the case of making the optical connector 70 compact. If a compact optical connector 70 is made without using the mirror 74, the optical waveguide path 712 would have a great curvature between the first end face 712a and the second end face 712b. In this case, the proportion of light leaking from the optical waveguide path 712 increases, resulting in an increase in optical loss. If the mirror 74 is used as in this embodiment, the mirror 74 enables bending of the optical waveguide path 712 at various angles while suppressing an increase in optical loss. In a compact optical connector 70, it is extremely effective to use the mirror 74. The optical waveguide path 712 has a plastic fiber. Because a plastic fiber has flexibility, the use of plastic fiber enables optical connectors 70 of various shapes to be obtained. In optical connectors 70 having various shapes, it is often desired to expose the optical waveguide path 712 at a variety of angles. The set of a plastic fiber optical waveguide path 712 and the mirror 74, therefore, is extremely effective in the case of providing compact optical connectors 70 with various shapes.

The optical connector 70 further has a linking section 711 to link to the fixing member 10. The linking section 711 has a protruding part 714 having a shape that substantially coincides with the shape of the second part 14 of the fixing member 10. The first end face 712a is exposed at the uppermost surface of the protruding part 714. The outer diameter of the protruding part 714 is adjusted to be smaller than the remaining part of the body 715. The linking section 711 further has a step surface 718 formed between the protruding part 714 and the body 715. The outer diameter of the protruding part 714, shown in FIG. 1, is adjusted to be smaller than the aperture 22 of the circuit board 20. The outer diameter of the remaining part of the body 715 is adjusted to be larger than the diameter of the aperture 22 of the circuit board 20 shown in FIG. 1. By doing so, the protruding part 714 of the optical connector 70 can pass through the aperture 22 of the circuit board 20. In contrast, the remaining part of the body 715 of the optical connector 70 cannot pass through the aperture 22 of the circuit board 20. Therefore, when the optical connector 70 is inserted into the aperture 22 of the circuit board 20, the rear surface of the circuit board 20 comes into contact with the step surface 718 of the optical connector 70. The protruding part 714 protruding from the aperture 22 of the circuit board 20 mates with the insertion hole 60 of the fixing member 10. When the protruding part 714 is inserted into the insertion hole 60 of the fixing member 10, the second end face 12b of the optical waveguide path 12 of the fixing member 10 and the first end face 712a of the optical waveguide path 712 of the protruding part 714 are optically coupled. The protruding part 714 and the second part 14 of the fixing member 10 are formed with a common shape. By doing so, it is possible to mate the optical connector 70 and the fixing member 10 using an arrangement as when a fixing member 10 is mated to a fixing member 10.

The optical connector 70 further has a linking hole 779a for linking to the external connector 72. The linking hole 779a has a shape substantially coinciding with the shape of the insertion hole 60 of the fixing member 10. As shown in FIG. 7, the external connector 72 has a linking protruding part 779b with a shape substantially coinciding with the shape of the second part 14 of the fixing member 10. Therefore, it is possible to mate the optical connector 70 and the external connector 72 using an arrangement as when a fixing member 10 is mated to a fixing member 10. When the linking protruding part 779b of the external connector 72 is inserted into the linking hole 779a of the optical connector 70, the second end face 712b of the optical connector 70 and the end face of the optical waveguide path 721 of the external connector 72 are optically coupled.

The optical connector 70 has a mirror 74. The optical waveguide path 712 extending inside the optical connector 70 bends via the mirror 74. By doing so, the first end face 712a and the second end face 712*b* of the optical waveguide path 712 are exposed at the surface of the optical connector 70 in different directions. Therefore, as shown in FIG. 8, the optical connector 70 can provide an optical communication path in a direction that is different from the axial direction of the fixing member 10.

Figure 9:
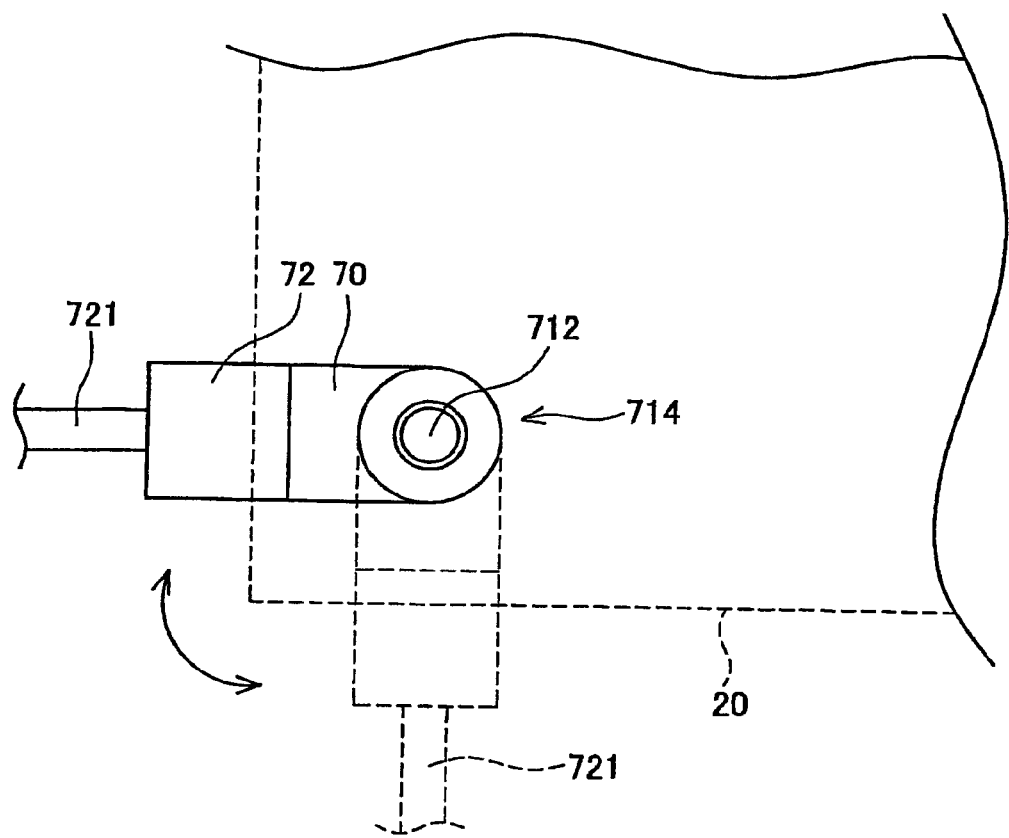
FIG. 9 shows that the optical connector is rotated about the axial direction of the fixing member.

FIG. 9 shows the condition in which the optical connector 70 is rotated about the axial direction of the fixing member 10. The protruding part 714 of the optical connector 70 has a cylindrical shape. The insertion hole 60 of the fixing member 10 has a shape substantially coinciding with the cylindrical shape. For this reason, as shown in FIG. 9, the optical connector 70 can rotate about the axial direction of fixing member 10. That is, the second end face 12*b* of the optical waveguide path 12 of the fixing member 10 and the first end face 712*a* of the optical waveguide path 712 of the optical connector 70 are optically coupled so as to allow rotation about the direction in which the first end face 712*a* and the second end face 12*b* opposes to each other. If it is possible to optically couple the first end face 712*a* of the optical connector 70 with the second end face 12*b* of the fixing member 10 so as to allow rotation about the direction in which the first end face 712*a* and the second end face 12*b* opposes to each other, it is possible to expose the second end face 712*b* of the optical waveguide path 712 of the optical connector 70 at various angles toward the radial direction of the fixing member 10. Therefore, the optical connector 70 can provide an optical communication path extending in various directions between the outside and the optical waveguide path 12 of the fixing member 10.

As shown in FIG. 6, the optical connector 70 also has a ground wire 33 for a ground potential and a power supply wire 38 for a power supply voltage. One end of the ground wire 33 is electrically connected to a third ground terminal 772 formed on the outside wall of the protruding part 714. The other end of the ground wire 33 is electrically connected to a fourth ground terminal 773 formed on the inner wall that defines the linking hole 779*a*. The ground wire 33 is provided on the outside of the optical waveguide path 712 and extends through the inside of the body 715. One end of the power supply wire 38 is electrically connected to a third power supply terminal 771 formed on the outer wall of the protruding part 714. The other end of the power supply wire 38 is electrically connected to a fourth power supply terminal 774 formed on the inside wall delineating the linking hole 779*a*. The power supply wire 38 is provided on the outside of the optical waveguide path 712 and extends through the inside of the body 715.

As shown in FIG. 7, the external connector 72 also has a ground wire 33 for a ground potential and a power supply wire 38 for a power supply voltage. One end of the ground wire 33 is electrically connected to a ground linking terminal 732 formed on the outer wall of the linking hole 779*b*. The other end of the ground wire 33 extends toward the outside. One end of the power supply wire 38 is electrically connected to a power supply voltage linking terminal 731 formed on the outer wall of the linking protruding part 779*b*. The other end of the power supply wire 38 extends toward the outside.

As shown in FIG. 8, when the fixing member 10 and the external connector 72 are linked via the optical connector 70, the ground wire 33 is electrically connected across the fixing member 10, the optical connector 70, and the external connector 72. In the same manner, the power supply wire 38 is electrically connected across the fixing member 10, the optical connector 70, and the external connector 72. Therefore, if the ground potential and power supply voltage are supplied to the ground wire 33 and the power supply wire 38 exposed to the outside, it is possible to supply the ground potential and the power supply voltage to a plurality of stacked circuit boards 20 via the optical connector 70 and the fixing member 10.

Figure 10:
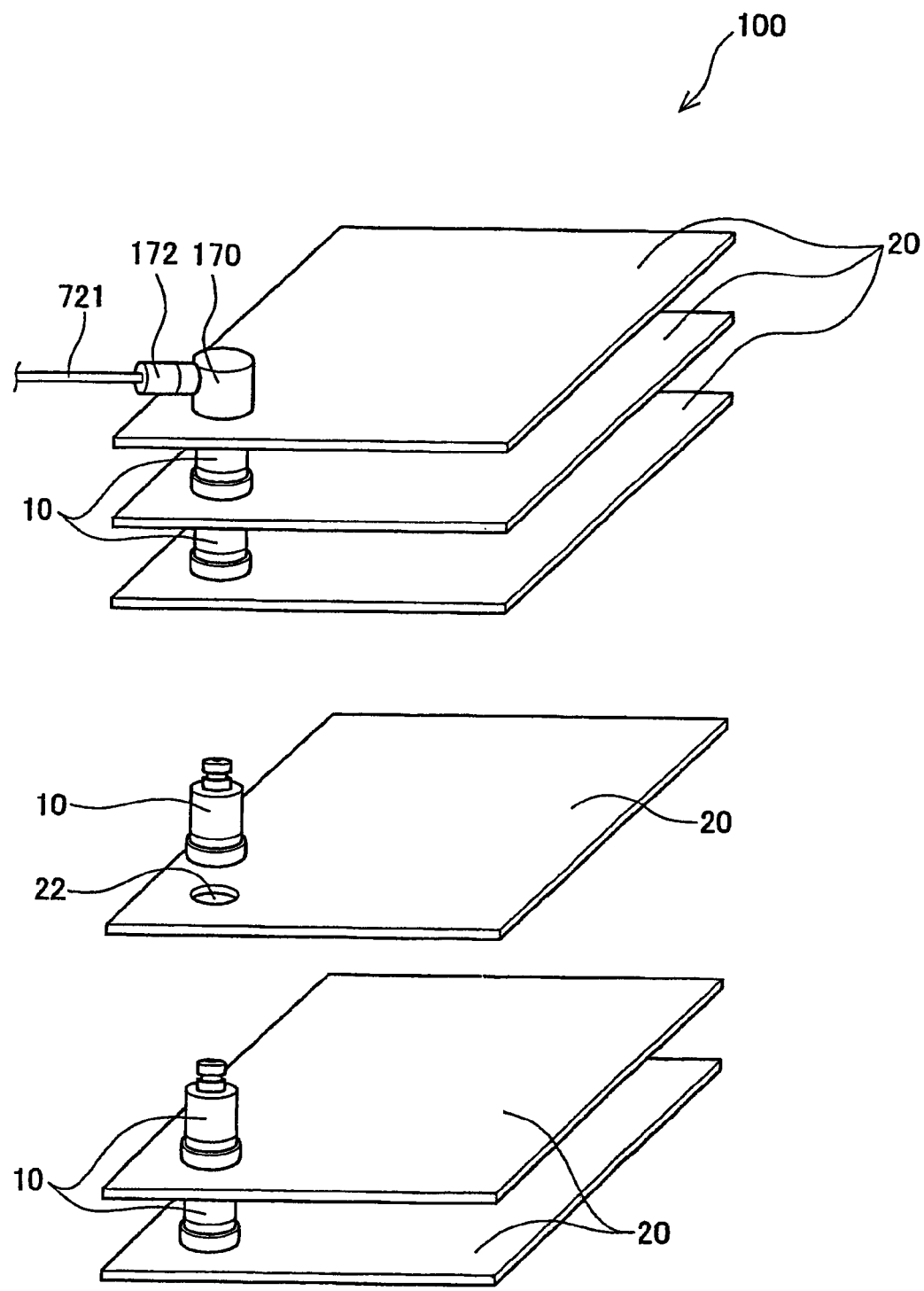
FIG. 10 shows the configuration of a module having an optical connector according to a first variation.
Figure 11:
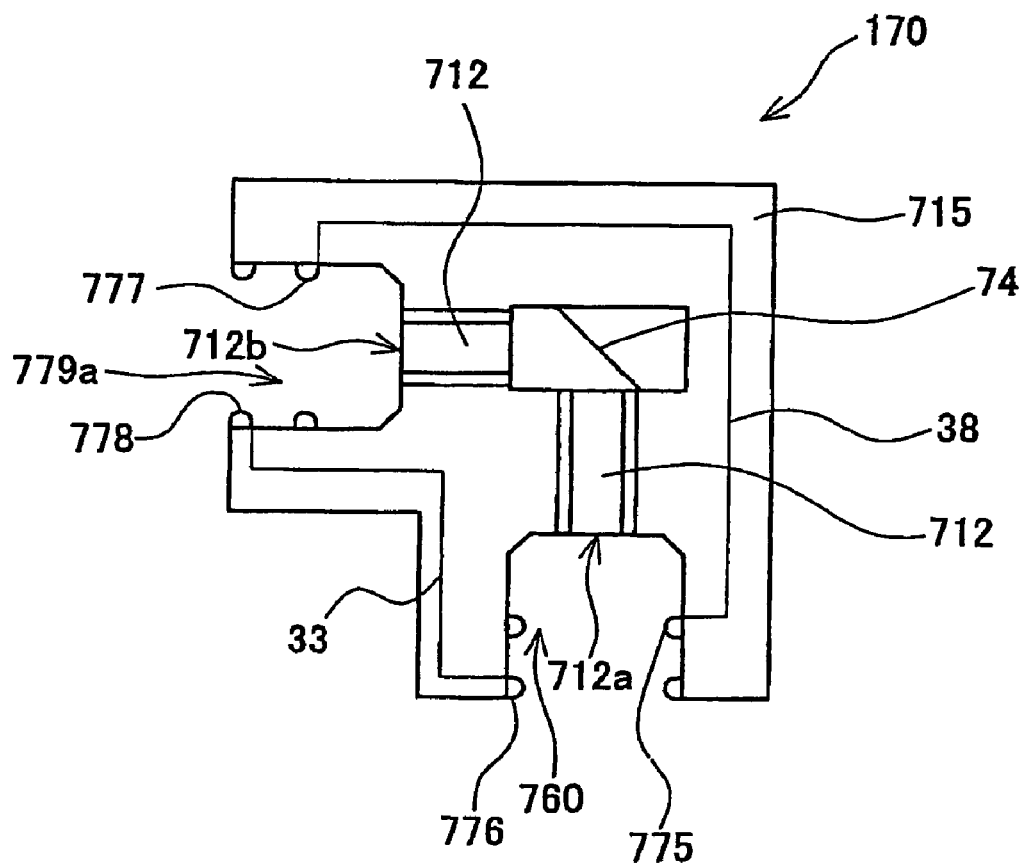
FIG. 11 is a schematic view of the cross-section of an optical connector according to the first variation.
Figure 12:
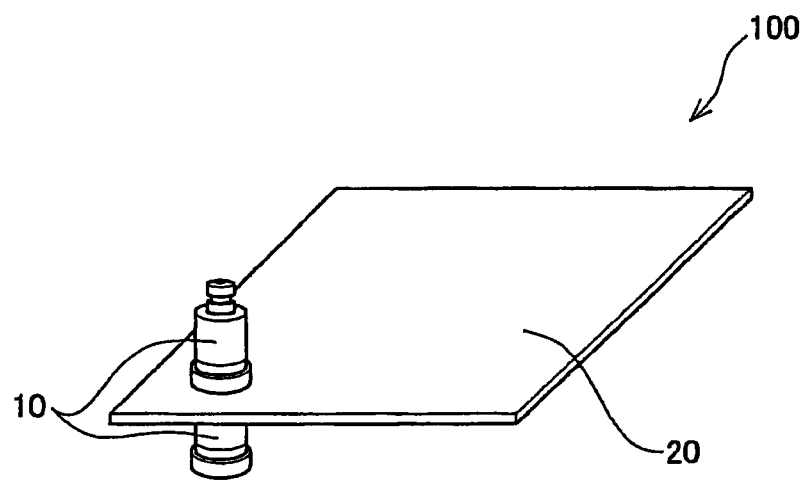
FIG. 12 shows the configuration of a module having an optical connector according to a second variation.
Figure 12:
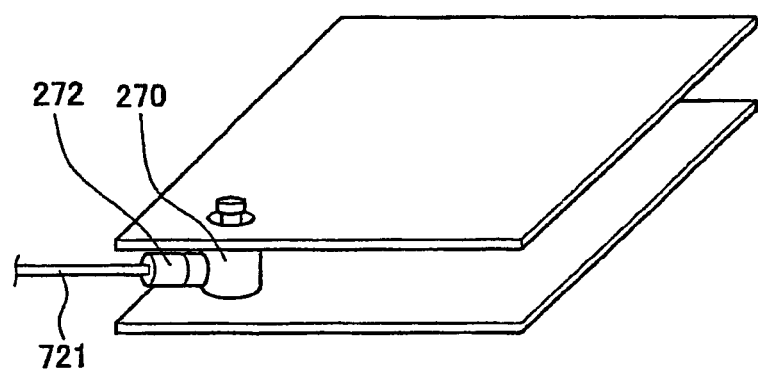
Figure 12:
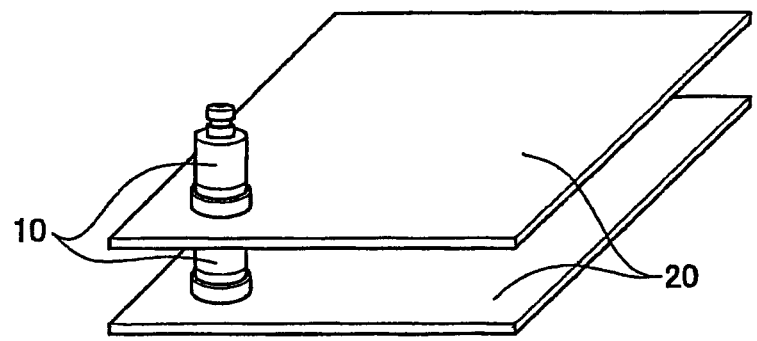
Figure 13:
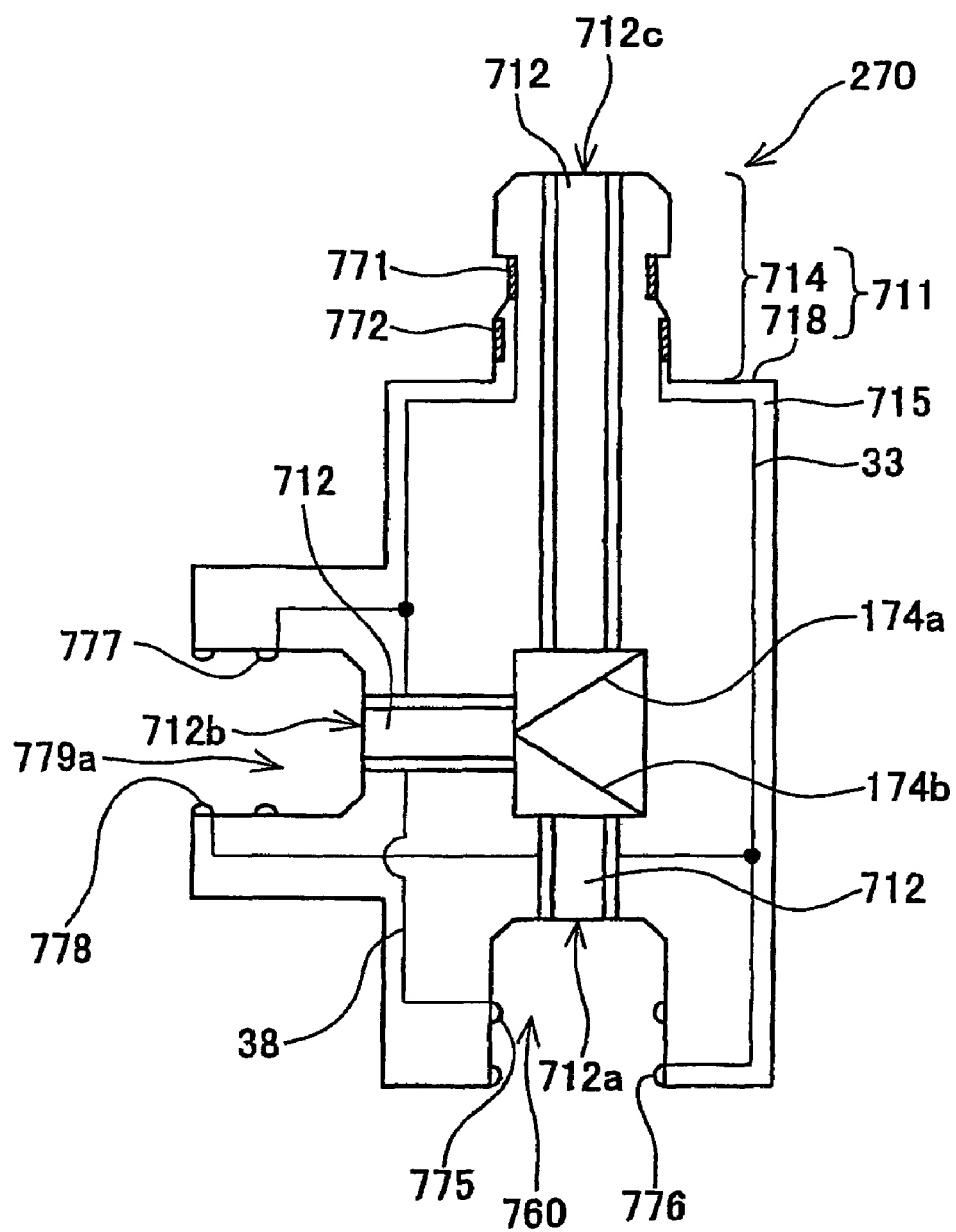
FIG. 13 is a schematic view of the cross-section of an optical connector according to the second variation.

FIG. 10 and FIG. 11 each show an optical connector 170 according to a first variation. FIG. 12 and FIG. 13 each show an optical connector 270 according to a second variation. Constituent elements that are one and the same with those in the optical connector 70 are assigned the same reference numerals and are not described herein.

The optical connector 170 shown in FIG. 10 and FIG. 11 has a circuit board 20 provided on the opposite side from the side of the optical connector 70 provided with the circuit board 20. The optical connector 170 has a mating hole 760 for linking to the fixing member 10. The linking hole 760 has a shape substantially coinciding with the shape of the insertion hole 60 of the fixing member 10. For this reason, the second part 14 of the fixing member 10 mates with the mating hole 760. It is possible to mate the optical connector 170 and the fixing member 10 using an arrangement as when a fixing member 10 is mated to a fixing member 10. When the mating hole 760 accepts the second part 14 of the fixing member 10, the first end face 12*a* of the optical waveguide path 12 of the fixing member 10 and the first end face 712*a* of the optical waveguide path 712 of the optical connector 170 are optically coupled.

The optical connector 170 also has a ground wire 33 for a ground potential and a power supply wire 38 for a power supply voltage. One end of the ground wire 33 is electrically connected to a fifth ground terminal 776 formed on the inside wall delineating the mating hole 760. The other end of the ground wire 33 is electrically connected to a sixth ground terminal 778 formed on the inner wall that defines the linking hole 779*a*. The ground wire 33 is provided on the outside of the optical waveguide path 712 and extends through the inside of the body 715. One end of the power supply wire 38 is electrically connected to a fifth power supply terminal 775 formed on the inner wall delineating the linking hole 779*a*. The other end of the power supply wire 38 is electrically connected to a sixth power supply terminal 777 formed on the inside wall delineating the linking hole 779*a*. The power supply wire 38 is provided on the outside of the optical waveguide path 712 and extends through the inside of the body 715. By doing so, in the case of the optical connector 170 as well, the ground wire 33 is electrically connected across the fixing member 10, the optical connector 170, and the external connector 172. In the same manner, the power supply wire 38 is electrically connected across the fixing member 10, the optical connector 170, and the external connector 172.

The optical connector 270 shown in FIG. 12 and FIG. 13 has a structure that combines the optical connector 70 and the optical connector 170. The optical connector 270 can be provided for any circuit board 20 between stacked circuit boards 20. The optical connector 270 has the protruding part 714 and the linking hole 779*a*, which are constituent elements of the optical connector 70. By providing these elements, the optical connector 270 can provide an optical communication path between the optical waveguide path 12 of the fixing member 10 linked by the protruding part 714 and the optical waveguide path 721 of the external connector 272 linked by the linking hole 779*a*. The optical connector 270 further has the mating hole 760 and the linking hole 779*a*, which are constituent elements of the optical connector 170. By providing these elements, the optical connector 270 can provide an optical communication path between the optical waveguide path 12 of the fixing member 10 linked by the mating hole 760 and the optical waveguide path 721 of the external connector 272 linked by the linking hole 779a. As shown in FIG. 13, the optical connector 270 has a pair of mirrors 174a, 174b. By providing these mirrors, an optical signal sent from the outside via the external connector 272 can be output from the end face 712a on one end and the end face 712c on the other end of the optical waveguide path 712 that extends in the axial direction. It is therefore possible to propagate an optical signal with respect to a circuit board 20 stacked above or below the optical connector 270. Alternatively, the pair of mirrors 174a, 174b can propagate an optical signal from a circuit board 20 stacked above or below the optical connector 270 toward the external connector 272. It is preferable that the pair of mirrors 174a, 174b be half mirrors. In this case, high-quality sending and receiving is possible of an optical signal between circuit boards 20 stacked above and below the optical connector 270. The optical connector 270 also serves the function of fixing one circuit board 20 with another circuit board 20.

The fixing member 10 also has the following characteristics.

(1) By providing an optical waveguide path 12 in the fixing member 10, it is not necessary to provide a separate member for an optical waveguide path in the circuit board. For this reason, the use of the fixing member 10 not only reduces the surface area of the circuit board 20, but also enables a reduction in the size of the module 100.

(2) The use of the fixing member 10 can provide a single optical waveguide path 12 that passes through a plurality of fixing members 10. For this reason, the use of the fixing member 10 not only reduces the surface area of the circuit board 20, but also enables a reduction in the size of the module 100. In addition, by providing only a single optical waveguide path 12, the structure for optical communication is simplified.

(3) The circuit board 20 is fixed by being held between fixing members 10 from above and below. Because a substantially circular aperture 22 is formed in the circuit board 20, and the fixing member 10 that is inserted into the aperture 22 is substantially cylindrical, if the holding force is adjusted it is possible to cause the circuit board 20 to rotate about the axis of the fixing member 10. It is therefore possible to adjust the position of the circuit board 20 about the axis of the fixing member 10. For this reason, it is possible to accurately align the positional relationship in the stacking direction between one circuit board 20 and another circuit board 20.

(4) Because both the light-emitting section 40 and the light-receiving section 50 are provided in the fixing member 10, it is possible to monitor the optical signal from a light-emitting section 40 by a light-receiving section 50 in one and the same fixing member 10. By doing so, it is possible to perform feedback control of the light-emitting section 40 based on the condition of the light-emitting section 40 monitored by the light-receiving section 50. In this case, if a processing circuit such as a microcomputer or the like connected between the light-emitting section 40 and the light-receiving section 50 is provided within the fixing member 10, it is possible to perform feedback control.

(5) In the light-receiving section 50 and the light-emitting section 40 provided in one and the same fixing member 10, the light-emitting section 40 may generate an optical signal as an indication that the light-receiving section 50 has obtained an optical signal from another fixing member 10. By operationally linking the light-receiving section 50 and the light-emitting section 40, it is possible to amplify an optical signal received from another fixing member 10, and also possible to propagate an optical signal to another fixing member 10. For example, even in the case in which a large number of circuit boards 20 are stacked, it is possible to compensate for the loss of energy of the optical signal, and propagate the optical signal to a large number of circuit boards 20. Even if a plastic fiber (which generally has a greater energy loss than a glass fiber) is used in the optical waveguide path 12, it is possible to compensate for the loss of energy of the optical signal, and propagate the optical signal to a plurality of circuit boards 20. In this case, by providing a processing circuit such as a microcomputer or the like connected between the light-emitting section 40 and the light-receiving section 50 within the fixing member 10, it is possible to adjust the timing of the generation of the optical signal by the light-emitting section 40.

The following structure can be adopted in place of the foregoing embodiment.

(6) In the light-receiving section 50 and the light-emitting section 40 provided in one and the same fixing member 10, the light-emitting section 40 may generate an optical signal of a different wavelength as an indication that the light-receiving section 50 has obtained an optical signal from another fixing member 10. By generating a different optical signal, it is also possible to add information regarding the condition of communication. For example, it is possible to add the information that an optical signal has been received by a prescribed circuit board 20.

(7) The optical signal may propagate within the optical waveguide path 12 in a selected direction only. In this case, a full-reflecting mirror can be used as the reflecting device. Additionally, in this case, in the light-receiving section 50 and the light-emitting section 40 provided in one and the same fixing member 10, the light-emitting section 40 may generate an optical signal as an indication that the light-receiving section 50 has obtained an optical signal from another fixing member 10. Additionally, in this case, a configuration may be adopted in which one end of an optical waveguide path 12 extending through linked fixing members 10 is optically coupled to the other end to form an optical waveguide loop. By doing so, even in the case in which propagation occurs in an optical waveguide path in one selected direction only, it is possible to send and receive information between a plurality of circuit boards 20. By operationally linking the light-receiving section 50 and the light-emitting section 40, it is possible to compensate for energy loss in the optical signal and propagate an optical signal toward a large number of circuit boards 20.

Figure 14:
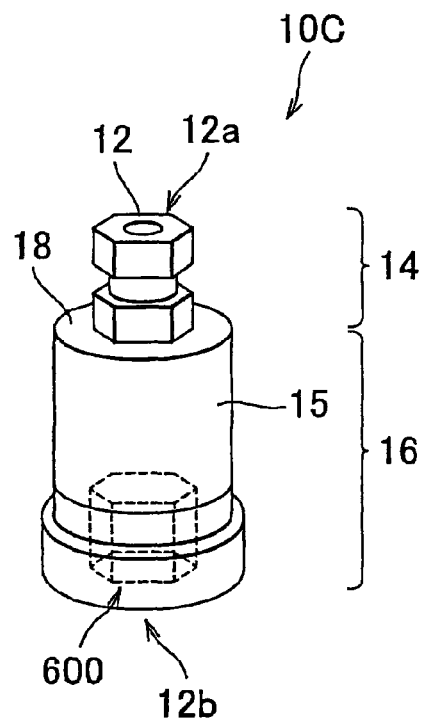
FIG. 14 shows a simplified enlarged perspective view of a variation of the fixing member.
Figure 15:
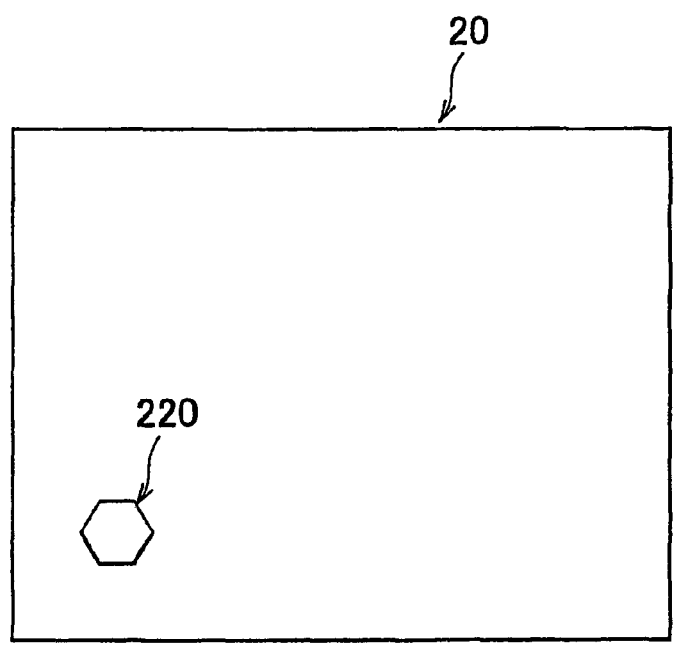
FIG. 15 shows a simplified plan view of a circuit board having an aperture for passage of a variation of the fixing member.

(8) The second part of the fixing member and the aperture of the circuit board may have shapes that prevent mutual rotation about the axis of the fixing member. For example, as shown in FIG. 14 and FIG. 15, the second part 14 of one fixing member 10C is substantially hexagonally shaped when viewed from the axial direction thereof, the insertion hole 600 of another fixing member 10C that links to the one fixing member 10C has substantially the same shape (substantially hexagonal) at the one fixing member 10C, and the aperture 220 formed in the circuit board 20 is substantially the same shape as the second part 14 of the one fixing member 10C when viewed from the axial direction thereof. The result is that, by passing the fixing member 10C through the aperture 220, the circuit board 20 and the fixing member 10C are prevented from rotating about the axis of the fixing member 10C. In this case, the circuit board 20 and the fixing member 10C are securely positioned, and the terminals 82, 84, 86, and 88 are securely positioned with respect to the circuit on the circuit board 20.

While the examples of the present invention are described in detail above, these are merely exemplary; and do not impose restrictions on the scope of the patent claims. The art recited in the claims includes a variety of variations on the exemplary examples provided. The technical elements described in the specification and the drawings exhibit technical usefulness alone or in various combinations, and are not restricted to the combinations recited in the claims at the time of filing. The art cited by examples in the specification and drawings can achieve a plurality of objects simultaneously, and the achievement of one object thereof itself has technical usefulness.

The invention claimed is:

1. A module, comprising:
a plurality of circuit boards;
at least one fixing member fixing the adjacent circuit boards with a prescribed distance therebetween and providing an optical communication path between the adjacent circuit boards; and
an optical connector linking to the fixing member and providing an optical communication path in a direction different from an axial direction of the fixing member, wherein
the fixing member includes:
a body; and
an optical waveguide path extending through the body, wherein
the optical connector includes:
a body;
a mirror within the body;
a first optical waveguide path extending from a first end face exposed at one part of the surface of the body, bending via the mirror, up to a second end face exposed at one part of the surface of the body and non-parallel with respect to the first end face;
a second optical waveguide path extending from the first end face, passing through the mirror, up to a third end face exposed at one part of the surface of the body and parallel with respect to the first end face; and
a linking section formed so as to include the first end face, and having a mechanism linking to the fixing member with the first end face being optically coupled to the optical waveguide path of the fixing member, wherein the linking section allows the optical connector to rotate relative to at least one of the plurality of circuit boards.

2. The module according to claim 1, wherein the linking section of the optical connector comprises a mechanism that, when linking to the fixing member, allows the first end face to be optically coupled to the end face of the optical waveguide path of the fixing member at one angle selected from a plurality of angles with respect to a direction in which the first end face and the end face oppose to each other.

3. The module according to claim 1, wherein at least one of the optical waveguide path of the fixing member, the first optical waveguide path of the optical connector, or the second optical waveguide path of the optical connector comprises a plastic fiber.

4. The module according to claim 1, wherein the body of the fixing member includes:
a first part; and
a second part with an outer diameter that is smaller than the first part, wherein
a step surface is formed between the first part and the second part.

5. The module according to claim 4, wherein the first part of the fixing member has an insertion hole accepting the second part of another fixing member, the insertion hole extending along the direction of passage of the optical waveguide path of the fixing member from the end face of the first part of the fixing member, and the shape of the insertion hole substantially coinciding with the shape of the second part, wherein when a second part of one fixing member is inserted into the insertion hole of another fixing member, the end face of the optical waveguide path of the another fixing member is optically coupled to the end face of the optical waveguide path of the one fixing member.

6. The module according to claim 5, wherein the fixing member includes:
a first terminal formed on at least a part of an inner wall that defines the insertion hole of the fixing member;
a second terminal formed on at least a part of an outer wall of the second part; and
a conductive wire, provided outside the optical waveguide path of the fixing member, electrically connecting the first terminal and the second terminal, wherein
when the second part of one fixing member is inserted into the insertion hole of another fixing member, the second terminal of the one fixing member is electrically connected to the first terminal of the another fixing member.

7. The module according to claim 5, wherein the linking section of the optical connector includes:
a protruding part having a shape substantially coinciding with the shape of the second part of the fixing member and/or a mating hole having a shape substantially coinciding with the shape of the insertion hole of the fixing member, wherein
in the case in which the protruding part is provided on the linking section, when the protruding part is inserted into the insertion hole of the fixing member, the end face of the optical waveguide path of the fixing member is optically coupled with the first end face of the protruding part, and wherein
in the case in which the mating hole is provided in the linking section, when the mating hole accepts the second part of the fixing member, the end face of the optical waveguide path of the fixing member is optically coupled with the first end face of the mating hole.

8. The module according to claim 6, wherein the linking section of the optical connector includes:
a protruding part having a shape substantially coinciding with the shape of the second part of the fixing member and/or a mating hole having a shape substantially coinciding with the shape of the insertion hole of the fixing member, wherein
in the case in which the linking section has the protruding part, the optical connector further includes:
a third terminal formed on at least a part of the outer wall of the protruding part;
a fourth terminal formed on a part of the surface of the body other than the protruding part; and
a conductive wire provided on the outside of the optical waveguide path electrically connecting the third terminal and the fourth terminal, wherein
when the protruding part is inserted into the insertion hole of the fixing member, the end face of the optical waveguide path of the fixing member is optically coupled with the first end face of the protruding part, and the first terminal of the fixing member is electrically connected to the third terminal of the protruding part, wherein
in the case in which the linking section has the mating hole, the optical connector further includes:
a fifth terminal formed on at least a part of the inner wall delineating the mating hole;

a sixth terminal formed on a part of the surface of the body other than the mating hole; and a conductive wire provided on the outside of the optical waveguide path electrically connecting the fifth terminal and the sixth terminal, wherein when the mating hole accepts the second part of the fixing member, the end face of the optical waveguide path of the fixing member is optically coupled with the first end face of the mating hole, and the second terminal of the fixing member is electrically connected to the fifth terminal of the mating hole.

9. The module according to claim 7, wherein apertures for passing the second part of the fixing member or the protruding part of the linking section of the optical connector are provided in the plurality of circuit boards, the apertures being shaped to substantially coincide in shape with either the second part or the protruding part passing therethrough.

10. The module according to claim 9, wherein the second part of the fixing member and the circuit board have shapes that prevent mutual rotation about the axis of the fixing member.

11. The module according to claim 7, wherein the second part of the fixing member and the protruding part of the linking section of the optical connector have a cylindrical shape, and wherein the insertion hole of the fixing member and the mating hole of the linking section of the optical connector have shapes substantially coinciding with the cylindrical shape.

12. The module according to claim 6, wherein a plurality of the sets of the first terminal, the second terminal, and the conductive wire are formed in the fixing member, of which, at least one set is for a ground potential and at least another is for a power supply voltage.

13. The module according to claim 1, wherein the fixing member further includes:

a first reflecting device provided inside the optical waveguide path of the fixing member to reflect an optical signal propagating within the optical waveguide path toward outside the optical waveguide path; and a light-receiving element provided on the outside of the optical waveguide path of the fixing member to convert an optical signal reflected by the first reflecting device to an electrical signal.

14. The module according to claim 13, wherein first reflecting device of the fixing member is a half mirror, the first reflecting device reflecting a part of the optical signal propagating within the optical waveguide path of the fixing member and passing the remaining part of the optical signal.

15. The module according to claim 14, wherein the first reflecting device of the fixing member has a pair of half mirrors, the first reflecting device reflecting a part of the optical signal that propagates through the optical waveguide path of the fixing member from one end to the other end and part of the optical signal that propagates through the optical waveguide path of the fixing member from the other end to the one end.

16. The module according to claim 13, wherein an end part of a connecting wire connected to the light-receiving element is exposed at a surface of the fixing member to establish wiring to electrically connect the light-receiving element and the circuit board.

17. The module according to claim 1, wherein the fixing member further includes:

a light-emitting element provided on the outside of the optical waveguide path of the fixing member to convert an electrical signal to an optical signal; and a second reflecting device provided within the optical waveguide path of the fixing member to reflect an optical signal from the light-emitting element toward inside the optical waveguide path.

18. The module according to claim 17, wherein the second reflecting device of the fixing member has a half mirror, reflects an optical signal from the light-emitting element toward inside the optical waveguide path of the fixing member, and passes an optical signal propagating through the optical waveguide path of the fixing member.

19. The module according to claim 18, wherein the second reflecting device of the fixing member has a pair of half mirrors, reflects an optical signal from the light-emitting element toward one end of the optical waveguide path, and reflects an optical signal from the light-emitting element toward the other end of the optical waveguide path.

20. The module according to claim 17, wherein an end part of a connecting wire connected to the light-emitting element is be exposed at the surface of the fixing member, thereby establishing wiring to electrically connect the light-emitting element and the circuit board.

21. A module, comprising:

a plurality of circuit boards;

a plurality of fixing members that fix the plurality of circuit boards with a prescribed distance therebetween and provide an optical communication path between the circuit boards; and an optical connector linking to the fixing member and providing an optical communication path in a direction different from an axial direction of the fixing member, wherein the fixing members include:

a first fixing member with a body, an optical waveguide path, a light-receiving element receiving a part of an optical signal propagating through the optical waveguide path to convert the optical signal to an electrical signal, and a light-emitting element emitting an optical signal to be introduced into the optical waveguide path, a second fixing member with a body, an optical waveguide path, and a light-receiving element receiving a part of an optical signal propagating through the optical waveguide path to convert the optical signal to an electrical signal, a third fixing member with a body, an optical waveguide path, and a light-emitting element emitting an optical signal to be introduced into the optical waveguide path, and a fourth fixing member with a body and an optical waveguide path, wherein the first fixing member to the fourth fixing member have a common shape, make connections from one fixing member to another fixing member, with a circuit board sandwiched therebetween, and allow optical coupling between an end face of the optical waveguide path of one fixing member and an end face of another fixing member, the first fixing member being connected to a circuit board that sends a signal to and receives a signal from other circuit boards, the second fixing member being connected to a circuit board that receives a signal from another circuit board, the third fixing member being connected to a circuit board that sends a signal to another circuit board, and the fourth fixing member being connected to a circuit board that neither sends a signal to nor receives a signal from another circuit board, wherein the optical connector includes:
- a body;
- a mirror provided within the body;
- a first optical waveguide path extending from a first end face exposed at one part of the surface of the body, bending via the mirror, up to a second end face exposed at one part of the surface of the body and non-parallel with respect to the first end face;
- a second optical waveguide path extending from the first end face, passing through the mirror, up to a third end face exposed at one part of the surface of the body and parallel with respect to the first end face; and
- a linking section, formed so as to include the first end face, linking to the fixing member with the first end face being optically coupled to the end face of optical waveguide path of the fixing member, wherein the linking section allows the optical connector to rotate relative to at least one of the plurality of circuit boards.

22. The module according to claim 21, wherein the linking section of the optical connector comprises a mechanism that, when linking to the fixing member, allows the first end face to be optically coupled to the end face of the optical waveguide path of the fixing member at one angle selected from a plurality of angles with respect to a direction in which the first end face and the end face oppose to each other.

23. An optical connector for a module having a plurality of circuit boards stacked via a fixing member, a first optical waveguide path passing through the fixing member and providing an optical communication path between the circuit boards, comprising: a body; a mirror provided inside the body; a second optical waveguide path extending from a first end face exposed at one part of the surface of the body, bending via the mirror, up to a second end face exposed at one part of the surface of the body and non-parallel with respect to the first end face; a third optical waveguide path extending from the first end face, passing through the mirror, up to a third end face exposed at one part of the surface of the body and parallel with respect to the first end face; and a linking section formed so as to include the first end face, and having a mechanism linking to the fixing member with the first end face being optically coupled to the end face of the first optical waveguide path, wherein the linking section, when linking to the fixing member, allows the optical connector to rotate relative to at least one of the plurality of circuit boards.

24. The optical connector according to claim 23, wherein the linking section of the optical connector comprises a mechanism that, when linking to the fixing member, allows the first end face to be optically coupled to the end face of the optical waveguide path of the fixing member at one angle selected from a plurality of angles with respect to a direction in which the first end face and the end face oppose each other.

* * * * *